United States Patent
Goto et al.

(10) Patent No.: US 11,618,473 B2
(45) Date of Patent: *Apr. 4, 2023

(54) VEHICLE CONTROL SYSTEM

(71) Applicant: TOYOTA JIDOSHA KABUSHIKI KAISHA, Toyota (JP)

(72) Inventors: Takayuki Goto, Yokohama (JP);
Yoshinori Watanabe, Isehara (JP);
Nobuhide Kamata, Susono (JP);
Kazuyuki Fujita, Gotemba (JP);
Masahiro Harada, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 339 days.

This patent is subject to a terminal disclaimer.

(21) Appl. No.: 17/019,804

(22) Filed: Sep. 14, 2020

(65) Prior Publication Data

US 2021/0107513 A1    Apr. 15, 2021

(30) Foreign Application Priority Data

Oct. 15, 2019    (JP) .............................. JP2019-188898

(51) Int. Cl.
*B60W 60/00*    (2020.01)
*B60W 10/20*    (2006.01)
(Continued)

(52) U.S. Cl.
CPC ........ *B60W 60/0011* (2020.02); *B60W 10/20* (2013.01); *B60W 30/09* (2013.01);
(Continued)

(58) Field of Classification Search
None
See application file for complete search history.

(56) References Cited

U.S. PATENT DOCUMENTS 10,759,477 B2    9/2020    Ide
10,974,732 B2    4/2021    Vladimerou
(Continued)

FOREIGN PATENT DOCUMENTS

CN    107074178 A  *   8/2017    ............ B60W 50/10
JP    2007-313932 A      12/2007
(Continued)

OTHER PUBLICATIONS

Machine translation of CN 107074178 A published Aug. 18, 2017 (Year: 2017).*

(Continued)

*Primary Examiner* — James J Lee
*Assistant Examiner* — David Hatch
(74) *Attorney, Agent, or Firm* — Sughrue Mion, PLLC

(57) ABSTRACT

A vehicle travel control device executes vehicle travel control such that a vehicle follows a target trajectory. An automated driving control device generates a first target trajectory that is the target trajectory for automated driving of the vehicle. The vehicle travel control device further determines whether or not an activation condition of travel assist control is satisfied. When the activation condition is satisfied, the vehicle travel control device generates a second target trajectory that is the target trajectory for the travel assist control. Even when the second target trajectory is generated during the automated driving, or when the second target trajectory is generated during the automated driving and a priority condition for giving priority to the first target trajectory is satisfied, the vehicle travel control device executes the vehicle travel control by giving more weight to the first target trajectory than to the second target trajectory.

16 Claims, 16 Drawing Sheets

(51) Int. Cl.
*G01C 21/34* (2006.01)
*B60W 30/09* (2012.01)
*B60W 30/095* (2012.01)
*B60W 10/18* (2012.01)
*B60W 10/06* (2006.01)
*B60W 10/08* (2006.01)

(52) U.S. Cl.
CPC .... *B60W 30/0956* (2013.01); *B60W 60/0013* (2020.02); *B60W 60/0015* (2020.02); *G01C 21/3407* (2013.01); *B60W 10/06* (2013.01); *B60W 10/08* (2013.01); *B60W 10/18* (2013.01)

(56) References Cited

U.S. PATENT DOCUMENTS

| | | |
|---|---|---|
| 11,008,007 B2 | 5/2021 | Tochigi et al. |
| 11,029,697 B2 | 6/2021 | Cunningham et al. |
| 11,072,342 B2 | 7/2021 | Kong et al. |
| 11,127,293 B2 | 9/2021 | Takeyama et al. |
| 11,155,262 B2 | 10/2021 | Avedisov et al. |
| 11,181,383 B2 | 11/2021 | Amini et al. |
| 11,220,255 B2 | 1/2022 | Crawford et al. |
| 11,231,285 B2 | 1/2022 | Hokai et al. |
| 11,247,688 B2 | 2/2022 | Lerner |
| 11,256,462 B2 | 2/2022 | Yamada et al. |
| 11,279,373 B2 | 3/2022 | Matsushita et al. |
| 11,315,418 B2 | 4/2022 | Kuffner, Jr. |
| 11,364,929 B2 | 6/2022 | Zaseck et al. |
| 2007/0276577 A1 | 11/2007 | Kuge et al. |
| 2013/0006513 A1 | 1/2013 | Nishiyama et al. |
| 2015/0066241 A1 | 3/2015 | Akiyama |
| 2015/0203113 A1 | 7/2015 | Duncan et al. |
| 2015/0353062 A1 | 12/2015 | Breuer et al. |
| 2016/0311431 A1 | 10/2016 | Kato |
| 2017/0108869 A1 | 4/2017 | Rohde et al. |
| 2017/0183004 A1 | 6/2017 | Bonarens et al. |
| 2017/0248950 A1* | 8/2017 | Moran .................. G05D 1/0022 |
| 2017/0248959 A1 | 8/2017 | Matsubara et al. |
| 2018/0059671 A1 | 3/2018 | Sogen et al. |
| 2018/0292822 A1 | 10/2018 | Ichikawa et al. |
| 2019/0317512 A1* | 10/2019 | Zhang .................. G05D 1/0238 |
| 2020/0223449 A1 | 7/2020 | Tsuji et al. |
| 2021/0107522 A1 | 4/2021 | Goto et al. |

FOREIGN PATENT DOCUMENTS

| | | |
|---|---|---|
| JP | 2011-191849 A | 9/2011 |
| JP | 2016-507416 A | 3/2016 |
| JP | 2016-203894 A | 12/2016 |
| JP | 2017-79067 A | 4/2017 |
| JP | 2017-114195 A | 6/2017 |
| JP | 2017-154554 A | 9/2017 |
| JP | 2018-32334 A | 3/2018 |
| JP | 2018-180859 A | 11/2018 |

OTHER PUBLICATIONS

Office Action dated Jan. 19, 2022 issued in U.S. Appl. No. 17/021,558.
Office Action dated May 16, 2022 issued in U.S. Appl. No. 17/021,558.
Notice of Allowance dated Aug. 31, 2022, issued in U.S. Appl. No. 17/021,558.
AFCP 2.0 Decision issued Aug. 31, 2022 in U.S. Appl. No. 17/021,558.
Examiner-Initiated Interview Summary dated Aug. 31, 2022 in U.S. Appl. No. 17/021,558.
Naoki Takahashi et al., "driving assistance device", 2017, Machine Translation of CN 107074178 A.
U.S. Appl. No. 17/021,558 dated Sep. 15, 2022.

* cited by examiner

VEHICLE CONTROL SYSTEM

BACKGROUND

Technical Field

The present disclosure relates to a vehicle control system that controls a vehicle performing automated driving. In particular, the present disclosure relates to a vehicle control system that controls a vehicle to follow a target trajectory.

Background Art

Patent Literature 1 discloses a driving operation assist device for a vehicle. The driving operation assist device performs RP transmission control and following travel control. The RP transmission control controls an accelerator pedal reactive force and driving/braking forces based on a risk potential with respect to an obstacle. The following travel control controls the driving/braking forces so as to keep an inter-vehicle distance to the obstacle. When both the RP transmission control and the following travel control are activated, priority is given to the following travel control than to the RP transmission control.

LIST OF RELATED ART

Patent Literature 1: Japanese Laid-Open Patent Application Publication No. 2007-313932

SUMMARY

Vehicle travel control that controls steering, acceleration, and deceleration of a vehicle is considered. In particular, let us consider a case where the vehicle travel control is executed such that the vehicle follows a target trajectory. During automated driving, the target trajectory is generated by an automated driving system. Then, the vehicle travel control is executed so that the vehicle follows the target trajectory for the automated driving.

Meanwhile, it is also envisioned that a "travel assist control function" which assists vehicle travel not constantly but as needed basis is applied to the vehicle. The travel assist control function controls at least one of the steering, the acceleration, and the deceleration of the vehicle as needed basis. If the travel assist control function intervenes in the automated driving, following performance with respect to the target trajectory for the automated driving is deteriorated. That is, continuity of the automated driving is decreased. This causes a sense of strangeness of an occupant of the vehicle.

An object of the present disclosure is to provide a technique that can suppress decrease in continuity of automated driving when vehicle travel control is executed so that the vehicle follows a target trajectory during the automated driving.

In an aspect of the present disclosure, a vehicle control system that controls a vehicle performing automated driving is provided.

The vehicle control system includes:

a vehicle travel control device configured to execute vehicle travel control that controls steering, acceleration, and deceleration of the vehicle such that the vehicle follows a target trajectory; and an automated driving control device configured to generate a first target trajectory being the target trajectory for the automated driving of the vehicle.

The vehicle travel control device is further configured to:

determine whether or not an activation condition of travel assist control is satisfied, wherein the travel assist control controls at least one of the steering, the acceleration, and the deceleration for at least one of improving safety or comfort of travel of the vehicle, reducing a sense of strangeness or insecurity of an occupant of the vehicle, and stabilizing behavior of the vehicle; and generate a second target trajectory being the target trajectory for the travel assist control when the activation condition is satisfied.

Even when the second target trajectory is generated during the automated driving, or when the second target trajectory is generated during the automated driving and a priority condition for giving priority to the first target trajectory is satisfied, the vehicle travel control device executes the vehicle travel control by giving more weight to the first target trajectory than to the second target trajectory.

The automated driving control device generates the first target trajectory for the automated driving of the vehicle. The vehicle travel control device generates the second target trajectory for the travel assist control when the activation condition of the travel assist control is satisfied. Even when the second target trajectory is generated during the automated driving, the vehicle travel control device executes the vehicle travel control by giving more weight to the first target trajectory than to the second target trajectory. It is thus possible to suppress influence of the travel assist control and to suppress deterioration of following performance with respect to the first target trajectory for the automated driving. That is, it is possible to suppress decrease in continuity of the automated driving.

Alternatively, when the second target trajectory is generated during the automated driving and the priority condition for giving priority to the first target trajectory is satisfied, the vehicle travel control device may execute the vehicle travel control by giving more weight to the first target trajectory than to the second target trajectory. As a result, it is possible to suppress decrease in continuity of the automated driving while appropriately utilizing the travel assist control.

EMBODIMENTS

Embodiments of the present disclosure will be described below with reference to the attached drawings.

1. OUTLINE

Figure 1:
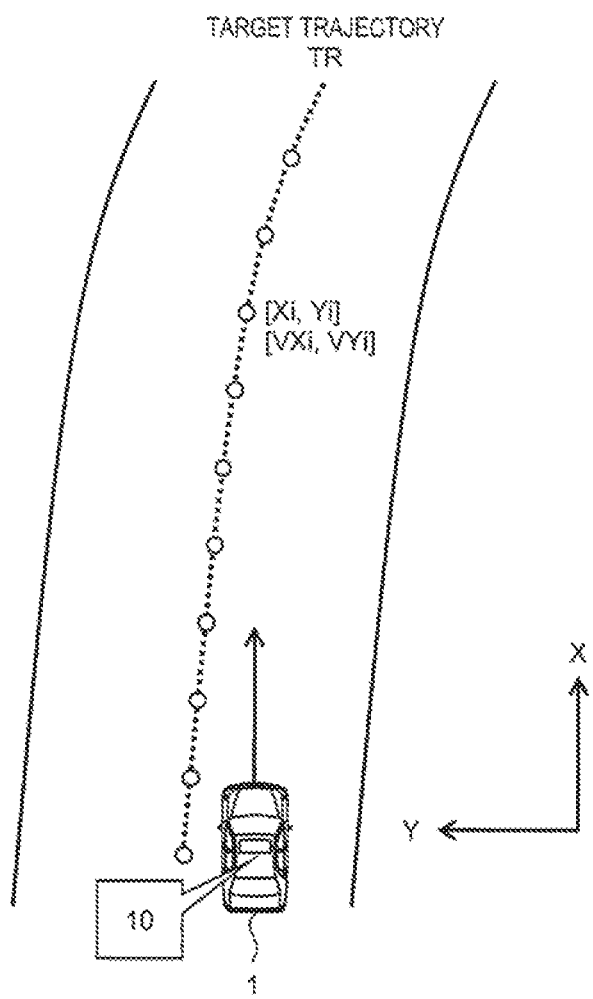
FIG. 1 is a conceptual diagram for explaining an outline of a vehicle control system according to an embodiment of the present disclosure.

FIG. 1 is a conceptual diagram for explaining an outline of a vehicle control system 10 according to the present embodiment. The vehicle control system 10 controls a vehicle 1. Typically, the vehicle control system 10 is installed on the vehicle 1. Alternatively, at least a part of the vehicle control system 10 may be placed in an external device outside the vehicle 1 and remotely control the vehicle 1. That is, the vehicle control system 10 may be distributed in the vehicle 1 and the external device.

The vehicle 1 is an automated driving vehicle capable of automated driving. The automated driving here means one where a driver does not necessarily have to 100% concentrate on driving (e.g., so-called Level 3 or more automated driving).

The vehicle control system 10 manages the automated driving of the vehicle 1. Moreover, the vehicle control system 10 executes "vehicle travel control" that controls steering, acceleration, and deceleration of the vehicle 1. In particular, during the automated driving, the vehicle control system 10 executes the vehicle travel control such that the vehicle 1 follows a target trajectory TR.

The target trajectory TR includes at least a set of target positions [Xi, Yi] of the vehicle 1 in a road on which the vehicle 1 travels. In the example shown in FIG. 1, an X-direction is a forward direction of the vehicle 1, and a Y-direction is a plane direction orthogonal to the X-direction. However, the coordinate system (X, Y) is not limited to the example shown in FIG. 1. The target trajectory TR may further include a target velocity [VXi, VYi] for each target position [Xi, Yi]. The target trajectory TR may include control range information such as upper and lower limits of the target position [Xi, Yi] and the target velocity [VXi, VYi], and desired traveling position range information. In order to make the vehicle 1 follow such the target trajectory TR, the vehicle control system 10 calculates a deviation (e.g., a lateral deviation, a yaw angle deviation, a velocity deviation, etc.) between the vehicle 1 and the target trajectory TR, and then performs the vehicle travel control such that the deviation decreases.

Figure 2:
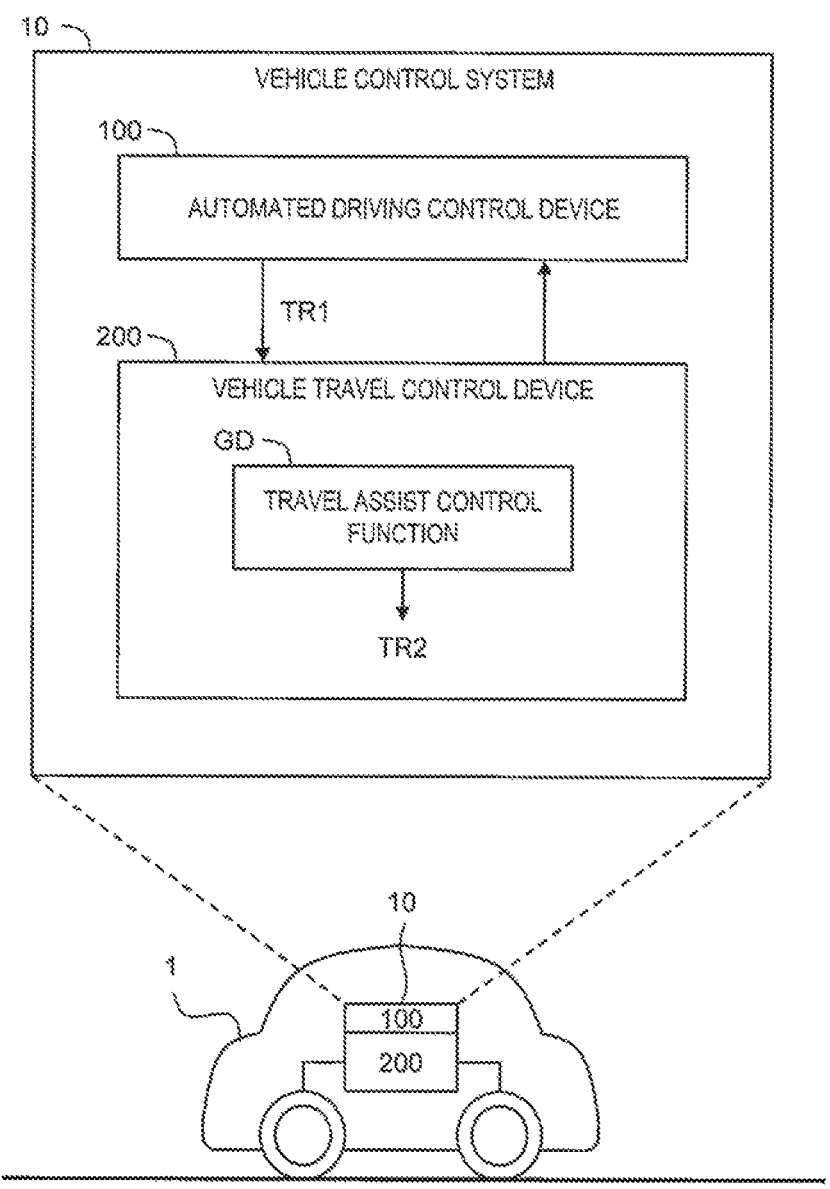
FIG. 2 is a block diagram schematically showing a configuration of the vehicle control system according to the embodiment of the present disclosure.

FIG. 2 is a block diagram schematically showing a configuration of the vehicle control system 10 according to the present embodiment. The vehicle control system 10 includes an automated driving control device 100 and a vehicle travel control device 200. The automated driving control device 100 and the vehicle travel control device 200 may be physically-separated devices, or may be an identical device. When the automated driving control device 100 and the vehicle travel control device 200 are physically-separated devices, they exchange necessary information via communication.

The automated driving control device 100 is responsible for management of the automated driving of the vehicle 1 among the functions of the vehicle control system 10. In particular, the automated driving control device 100 generates the target trajectory TR for the automated driving of the vehicle 1. For example, the automated driving control device 100 uses a sensor to detect (recognize) a situation around the vehicle 1. Then, the automated driving control device 100 generates a travel plan of the vehicle 1 during the automated driving based on a destination and the situation around the vehicle 1. The travel plan includes maintaining a current travel lane, making a lane change, avoiding an obstacle, and so forth. The automated driving control device 100 then generates the target trajectory TR required for the vehicle 1 to travel in accordance with the travel plan.

The target trajectory TR for the automated driving generated by the automated driving control device 100 is hereinafter referred to as a "first target trajectory TR1." The automated driving control device 100 outputs the generated first target trajectory TR1 to the vehicle travel control device 200.

On the other hand, the vehicle travel control device 200 is responsible for the vehicle travel control among the functions of the vehicle control system 10. That is, the vehicle travel control device 200 controls the steering, the acceleration, and the deceleration of the vehicle 1. In particular, the vehicle travel control device 200 controls the steering, the acceleration, and the deceleration of the vehicle 1 such that the vehicle 1 follows the target trajectory TR. In order to make the vehicle 1 follow the target trajectory TR, the vehicle travel control device 200 calculates a deviation (e.g., a lateral deviation, a yaw angle deviation, a velocity deviation, etc.) between the vehicle 1 and the target trajectory TR, and then performs the vehicle travel control such that the deviation decreases.

During the automated driving of the vehicle 1, the vehicle travel control device 200 receives the first target trajectory TR1 from the automated driving control device 100. Basically, the vehicle travel control device 200 executes the vehicle travel control such that the vehicle 1 follows the first target trajectory TR1.

The vehicle travel control device 200 according to the present embodiment further has a function of "travel assist control" (travel assist control function GD) that assists travel of the vehicle 1. More specifically, the travel assist control controls at least one of the steering, the acceleration, and the deceleration of the vehicle 1 for at least one of improving safety or comfort of travel of the vehicle 1, reducing a sense of strangeness or insecurity of an occupant of the vehicle 1, and stabilizing behavior of the vehicle 1. Such the travel assist control is exemplified by collision avoidance control, lane departure suppression control, damping control, vehicle stability control, and the like. The collision avoidance control assists avoidance of a collision between the vehicle 1 and a surrounding object (namely, an avoidance target). The lane departure suppression control suppresses the vehicle 1 from departing from a travel lane. The damping control suppresses pitching and rolling of the vehicle 1. The vehicle stability control suppresses unstable behavior such as vehicle spin.

The vehicle travel control device 200 uses sensors to detect a situation around the vehicle 1 and a state of the vehicle 1. Then, based on the detection result, the vehicle travel control device 200 (the travel assist control function GD) determines whether or not it is necessary to activate the travel assist control. In other words, the vehicle travel control device 200 determines whether or not an "activation condition" for activating the travel assist control is satisfied. When the activation condition is satisfied, the vehicle travel control device 200 (the travel assist control function GD) generates the target trajectory TR for the travel assist control. The target trajectory TR for the travel assist control generated by the vehicle travel control device 200 is hereinafter referred to as a "second target trajectory TR2."

When the activation condition of the travel assist control is satisfied and the second target trajectory TR2 is generated during the automated driving, both the first target trajectory TR1 for the automated driving and the second target trajectory TR2 for the travel assist control are generated coincidentally. The first target trajectory TR1 and the second target trajectory TR2 are not necessarily consistent with each other. It is therefore necessary to arbitrate between the first target trajectory TR1 and the second target trajectory TR2 to determine a definitive target trajectory TR.

The vehicle travel control device 200 according to the present embodiment further has a function of arbitrating between the first target trajectory TR1 and the second target trajectory TR2 to determine the definitive target trajectory TR. In particular, according to the present embodiment, more priority is given to the first target trajectory TR1 for the automated driving than to the second target trajectory TR2 for the travel assist control, from the following point of view.

Figure 3:
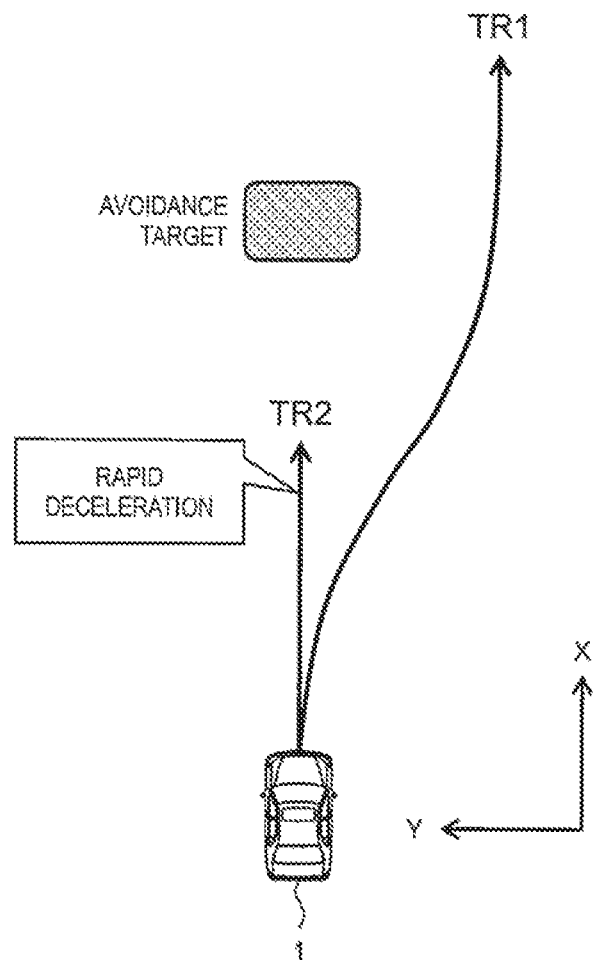
FIG. 3 is a conceptual diagram for explaining the outlie of the vehicle control system according to the embodiment of the present disclosure.

As an example, FIG. 3 shows a situation where there is an avoidance target such as a pedestrian or an obstacle ahead of the vehicle 1. The automated driving control device 100 recognizes the avoidance target and generates the first target trajectory TR1 required for the vehicle 1 to travel while avoiding a collision with the avoidance target. Moreover, the vehicle travel control device 200 provided with the travel assist control function GD also recognizes the same avoidance target and generates the second target trajectory TR2 that can avoid a collision with the avoidance target. In the example shown in FIG. 3, the first target trajectory TR1 demands at least the steering of the vehicle 1, and the second target trajectory TR2 demands rapid deceleration of the vehicle 1.

If priority is given to the second target trajectory TR2, following performance with respect to the first target trajectory TR1 for the automated driving is deteriorated, although it is possible to avoid the collision with the avoidance target. That is to say, continuity of the automated driving is decreased. This causes a sense of strangeness of an occupant of the vehicle 1. On the other hand, the collision with the avoidance target can be avoided even by giving priority to the first target trajectory TR1. Furthermore, giving priority to the first target trajectory TR1 makes it possible to suppress influence of the travel assist control and to suppress deterioration of the following performance with respect to the first target trajectory TR1.

Figure 4:
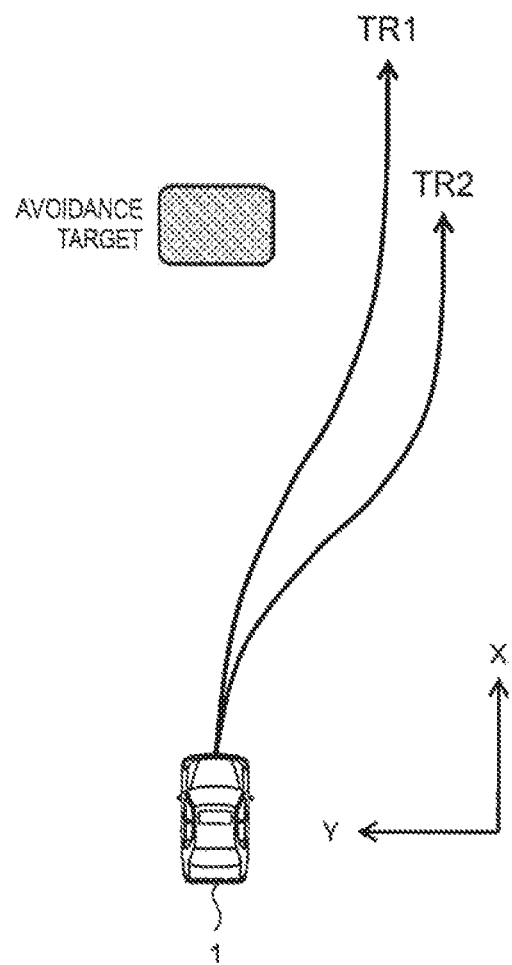
FIG. 4 is a conceptual diagram for explaining the outlie of the vehicle control system according to the embodiment of the present disclosure.

In an example shown in FIG. 4, both the first target trajectory TR1 and the second target trajectory TR2 demand the steering of the vehicle 1 in order to avoid the collision with the avoidance target. In this case also, giving priority to the first target trajectory TR1 makes it possible to suppress decrease in the continuity of the automated driving while avoiding the collision with the avoidance target.

As described above, the automated driving control device 100 is considered to recognize risks and the like ahead of the vehicle 1 and generate an appropriate first target trajectory TR1. In view of the above, even when the second target trajectory TR2 is generated during the automated driving, the vehicle travel control device 200 gives priority to the first target trajectory TR1. In other words, the vehicle travel control device 200 executes the vehicle travel control by giving more "weight" to the first target trajectory TR1 than to the second target trajectory TR2. It is thus possible to suppress the influence of the travel assist control and to suppress deterioration of the following performance with respect to the first target trajectory TR1 for the automated driving. That is, it is possible to suppress decrease in the continuity of the automated driving.

Giving more weight to the first target trajectory TR1 than to the second target trajectory TR2 includes selecting the first target trajectory TR1 as the definitive target trajectory TR. In this case, the vehicle travel control device 200 executes the vehicle travel control by using the first target trajectory TR1 as the target trajectory TR. In this case, the continuity of the automated driving is maintained.

In addition, giving more weight to the first target trajectory TR1 than to the second target trajectory TR2 includes combining the second target trajectory TR2 and the first target trajectory TR1 to determine the definitive target trajectory TR. Here, a weight (a first weight W1) of the first target trajectory TR1 with respect to the target trajectory TR is greater than a weight (a second weight W2) of the second target trajectory TR2 with respect to the target trajectory TR. Even in this case, decrease in the continuity of the automated driving is suppressed.

It should be noted that there is no need to always give priority to the first target trajectory TR1. In order to make more flexible operation possible, the priority may be conditionally given to the first target trajectory TR1. A condition for giving priority to the first target trajectory TR1 is hereinafter referred to as a "priority condition." When the second target trajectory TR2 is generated during the automated driving and the priority condition is satisfied, the vehicle travel control device 200 may execute the vehicle travel control by giving more weight to the first target trajectory TR1 than to the second target trajectory TR2. As a result, it is possible to suppress decrease in the continuity of the automated driving while appropriately utilizing the travel assist control. Various examples of the priority condition will be described later.

The automated driving control device 100 and the vehicle travel control device 200 may be separately designed and developed. For example, the vehicle travel control device 200 responsible for the vehicle travel control is designed and developed by an automaker. On the premise of utilizing the vehicle travel control device 200, an automated driving service provider can design and develop software for the automated driving control device 100. In that sense, it can be said that the vehicle travel control device 200 is a platform for automated driving services.

Hereinafter, the vehicle control system 10 according to the present embodiment will be described in more detail.

2. AUTOMATED DRIVING CONTROL DEVICE 100

2-1. Configuration Example

Figure 5:
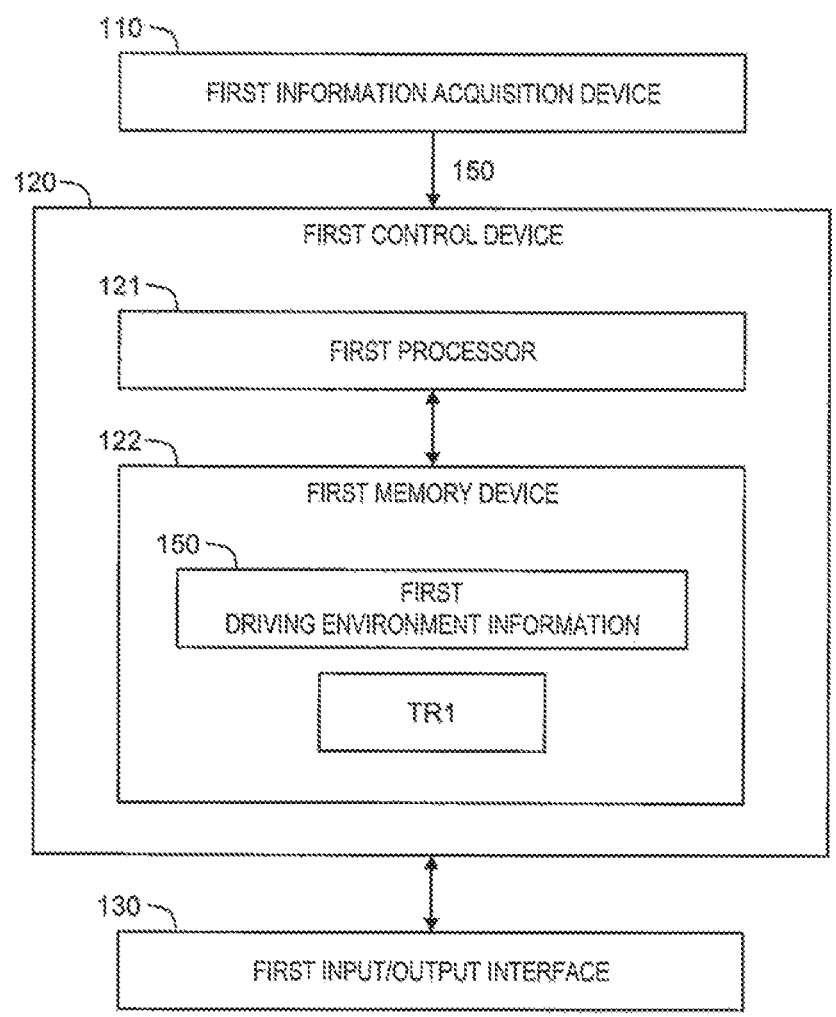
FIG. 5 is a block diagram showing a configuration example of an automated driving control device according to the embodiment of the present disclosure.

FIG. 5 is a block diagram showing a configuration example of the automated driving control device 100 according to the present embodiment. The automated driving control device 100 is provided with a first information acquisition device 110, a first control device 120, and a first input/output interface 130.

The first information acquisition device 110 acquires first driving environment information 150. The first driving environment information 150 is information indicating a driving environment for the vehicle 1 and necessary for the automated driving of the vehicle 1.

Figure 6:
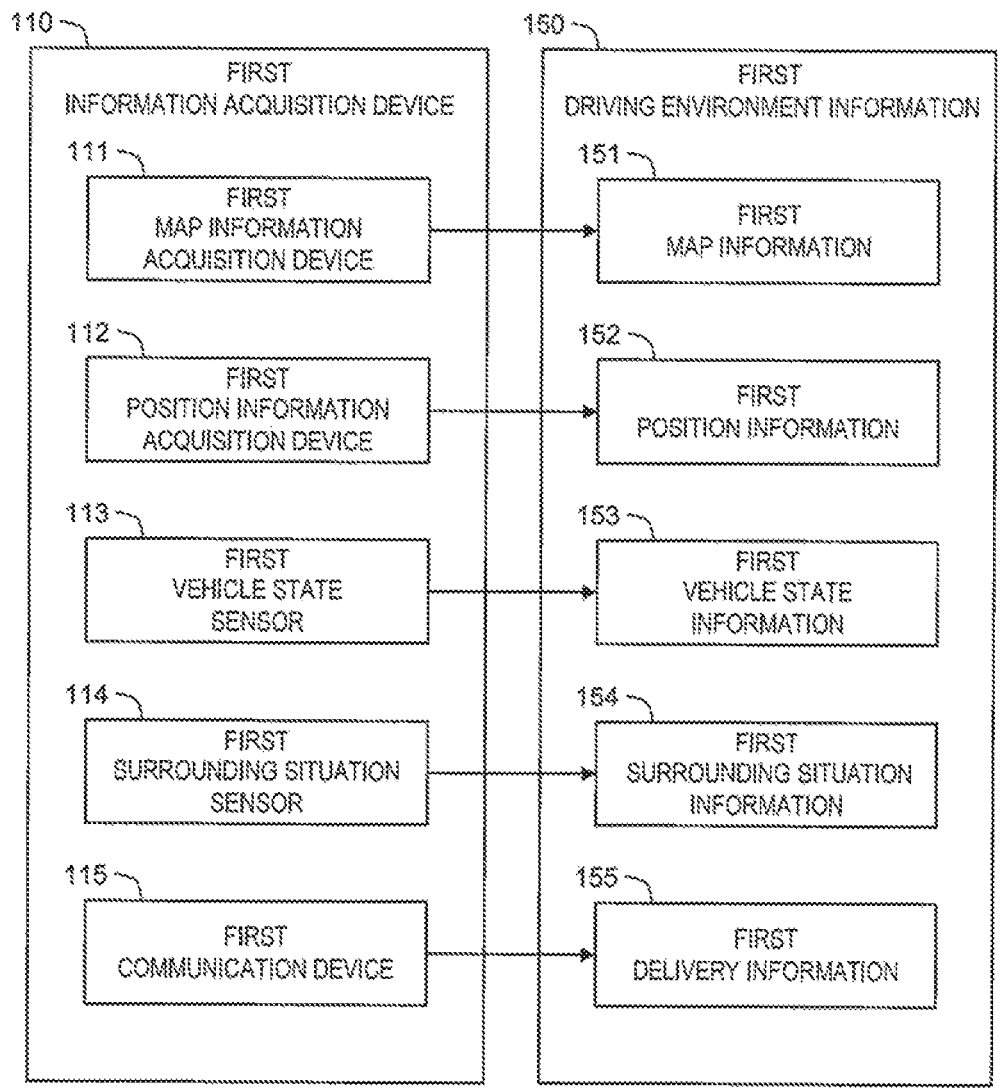
FIG. 6 is a block diagram showing an example of a first information acquisition device and first driving environment information in the automated driving control device according to the embodiment of the present disclosure.

FIG. 6 is a block diagram showing an example of the first information acquisition device 110 and the first driving environment information 150. The first information acquisition device 110 includes a first map information acquisition device 111, a first position information acquisition device 112, a first vehicle state sensor 113, a first surrounding situation sensor 114, and a first communication device 115. The first driving environment information 150 includes first map information 151, first position information 152, first vehicle state information 153, first surrounding situation information 154, and first delivery information 155.

The first map information acquisition device 111 acquires the first map information 151. The first map information 151 indicates a lane configuration and a road shape. The first map information acquisition device 111 acquires the first map information 151 of a necessary area from a map database. The map database may be stored in a predetermined memory device mounted on the vehicle 1, or may be stored in a management server outside the vehicle 1. In the latter case, the first map information acquisition device 111 communicates with the management server to acquire the necessary first map information 151.

The first position information acquiring device 112 acquires the first position information 152 indicating a position and an orientation of the vehicle 1. For example, the first position information acquiring device 112 includes a GPS (Global Positioning System) device for measuring the position and the orientation of the vehicle 1. The first position information acquisition device 112 may perform well-known localization to increase accuracy of the first position information 152.

The first vehicle state sensor 113 acquires the first vehicle state information 153 indicating a state of the vehicle 1. For example, the first vehicle state sensor 113 includes a vehicle speed sensor, a yaw rate sensor, an acceleration sensor, a steering angle sensor, and the like. The vehicle speed sensor detects a vehicle speed (i.e., a speed of the vehicle 1). The yaw rate sensor detects a yaw rate of the vehicle 1. The acceleration sensor detects an acceleration (e.g., a lateral acceleration, a longitudinal acceleration, a vertical acceleration) of the vehicle 1. The steering angle sensor detects a steering angle (a wheel turning angle) of the vehicle 1.

The first surrounding situation sensor 114 recognizes (detects) a situation around the vehicle 1. For example, the first surrounding situation sensor 114 includes at least one of a camera, a LIDAR (Laser Imaging Detection and Ranging), and a radar. The first surrounding situation information 154 indicates a result of recognition by the first surrounding situation sensor 114. For example, the first surrounding situation information 154 includes target information about a target recognized by the first surrounding situation sensor 114. The target is exemplified by a surrounding vehicle, a pedestrian, a roadside structure, an obstacle, a white line (lane marking), and the like. The target information includes information on a relative position and a relative velocity of the target with respect to the vehicle 1.

The first communication device 115 communicates with the outside of the vehicle 1. For example, the first communication device 115 communicates with an external device outside of the vehicle 1 via a communication network. The first communication device 115 may perform V2I communication (vehicle-to-infrastructure communication) with a surrounding infrastructure. The first communication device 115 may perform V2V communication (vehicle-to-vehicle communication) with a surrounding vehicle. The first delivery information 155 is information acquired through the first communication device 115. For example, the first delivery information 155 includes information on the surrounding vehicle and road traffic information (e.g., road work zone information, accident information, traffic restriction information, traffic jam information, etc.).

It should be noted that a part of the first information acquisition device 110 may be included in the vehicle travel control device 200. That is, the automated driving control device 100 and the vehicle travel control device 200 may share a part of the first information acquisition device 110. In that case, the automated driving control device 100 and the vehicle travel control device 200 exchange necessary information with each other.

Referring again to FIG. 5, the first input/output interface 130 is communicably connected with the vehicle travel control device 200.

The first control device 120 (i.e., a first controller) is an information processing device for executing a variety of processing. For example, the first control device 120 is a microcomputer. The first control device 120 is also called an ECU (Electronic Control Unit). More specifically, the first control device 120 includes a first processor 121 and a first memory device 122.

A variety of information is stored in the first memory device 122. For example, the first driving environment information 150 acquired by the first information acquisition device 110 is stored in the first memory device 122. The first memory device 122 is exemplified by a volatile memory, a nonvolatile memory, an HDD (Hard Disk Drive), and the like.

The first processor 121 executes automated driving software which is a computer program. The automated driving software is stored in the first memory device 122 or recorded on a computer-readable recording medium. The functions of the first control device 120 (the first processor 121) are realized by the first processor 121 executing the automated driving software.

According to the present embodiment, the first control device 120 (the first processor 121) is responsible for the management of the automated driving of the vehicle 1. In particular, the first control device 120 generates the first target trajectory TR1 for the automated driving of the vehicle 1. Hereinafter, generating the first target trajectory TR1 will be described in more detail.

2-2. Generating First Target Trajectory

Figure 7:
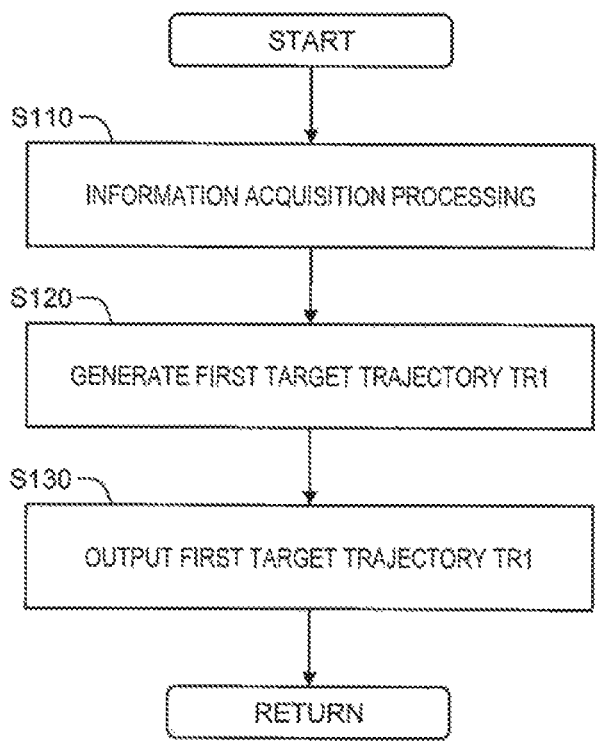
FIG. 7 is a flow chart showing processing by the automated driving control device according to the embodiment of the present disclosure.

FIG. 7 is a flow chart showing processing by the first control device 120 (the first processor 121) of the automated driving control device 100 according to the present embodiment. During the automated driving of the vehicle 1, the process flow shown in FIG. 7 is repeatedly executed at a regular interval.

In Step S110, the first control device 120 acquires the first driving environment information 150 from the first information acquisition device 110. The first driving environment information 150 is stored in the first memory device 122.

In Step S120, the first control device 120 generates the first target trajectory TR1 for the automated driving of the vehicle 1, based on the first driving environment information 150. More specifically, the first control device 120 generates a travel plan of the vehicle 1 during the automated driving, based on the first driving environment information 150. The travel plan includes maintaining a current travel lane, making a lane change, avoiding an obstacle, and so forth. Then, the first control device 120 generates the first target trajectory TR1 required for the vehicle 1 to travel in accordance with the travel plan, based on the first driving environment information 150.

For example, the first control device 120 generates the first target trajectory TR1 for traveling while maintaining a current travel lane. More specifically, based on the first map information 151 (the lane configuration) and the first position information 152, the first control device 120 recognizes a travel lane in which the vehicle 1 is traveling and acquires a configuration shape of the travel lane ahead of the vehicle 1. Alternatively, based on the first surrounding situation information 154, the first control device 120 may recognize a lane marking (i.e., a white line) of the travel lane and recognize a configuration shape of the travel lane ahead of the vehicle 1. Then, the first control device 120 generates the first target trajectory TR1 for traveling while maintaining the travel lane, based on the configuration shape of the travel lane ahead of the vehicle 1.

As another example, the first control device 120 may generate the first target trajectory TR1 for making a lane change. More specifically, based on the first map information 151 (the lane configuration), the first position information 152, and a destination, the first control device 120 plans to make a lane change in order to reach the destination. Then, the first control device 120 generates the first target trajectory TR1 for realizing the lane change, based on the first map information 151 (the lane configuration), the first position information 152, the first vehicle state information 153, and the first surrounding situation information 154 (the positions of other vehicles).

As yet another example, the first control device 120 may generate the first target trajectory TR1 for avoiding a collision between the vehicle 1 and a surrounding object. More specifically, based on the first surrounding situation information 154 (the target information), the first control device 120 recognizes an avoidance target (e.g., a surrounding vehicle, a pedestrian) ahead of the vehicle 1. Furthermore, based on the first vehicle state information 153 and the first surrounding situation information 154 (the target information), the first control device 120 predicts respective future positions of the vehicle 1 and the avoidance target and calculates a possibility that the vehicle 1 collides with the avoidance target. If the possibility that the vehicle 1 collides with the avoidance target is equal to or higher than a threshold, the first control device 120 generates the first target trajectory TR1 for avoiding the collision based on the first vehicle state information 153 (the target information) and the first surrounding situation information 154. Typically, the first target trajectory TR1 for avoiding the collision demands at least one of the steering and the deceleration.

In Step S130, the first control device 120 outputs the generated first target trajectory TR1 to the vehicle travel control device 200 via the first input/output interface 130. Every time the first target trajectory TR1 is updated, the latest first target trajectory TR1 is output to the vehicle travel control device 200.

3. VEHICLE TRAVEL CONTROL DEVICE 200

3-1. Configuration Example

Figure 8:
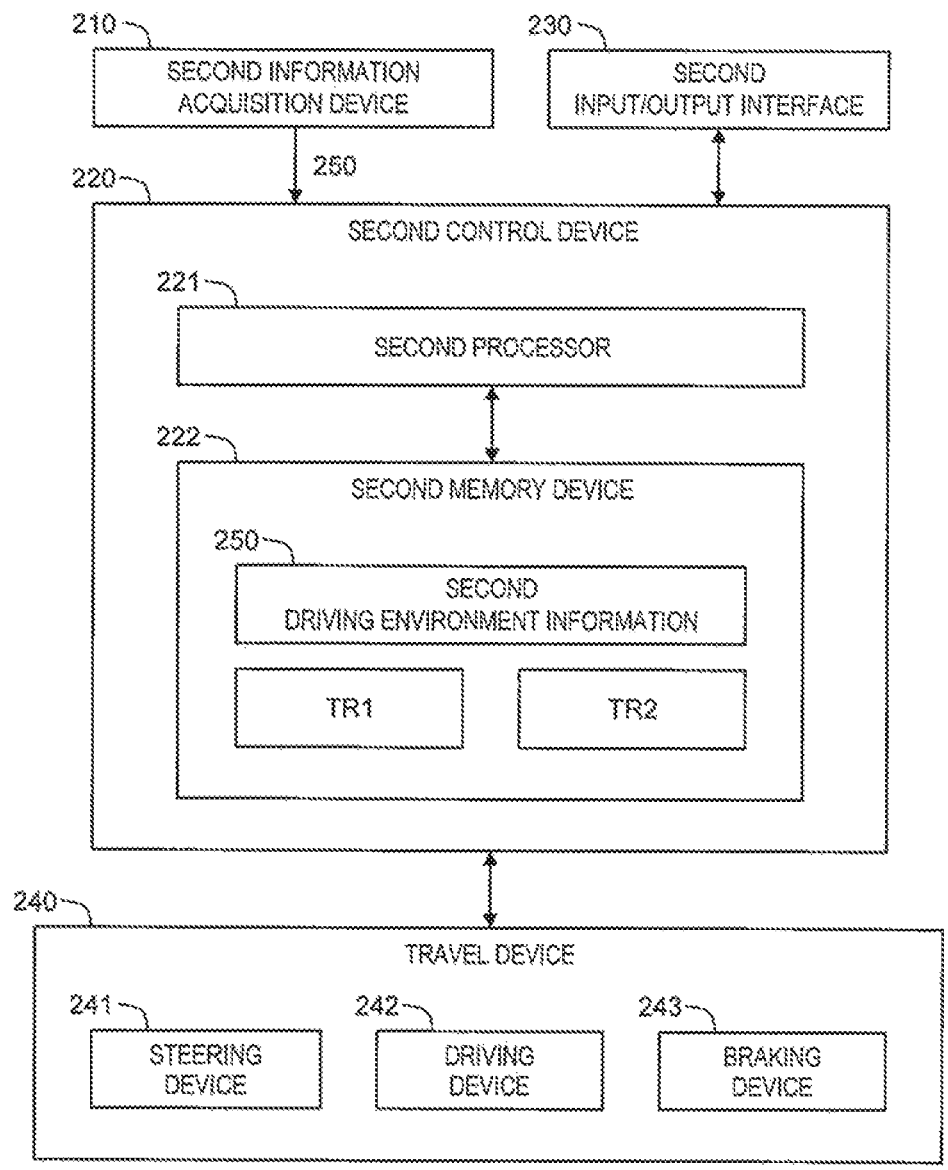
FIG. 8 is a block diagram showing a configuration example of a vehicle travel control device according to the embodiment of the present disclosure.

FIG. 8 is a block diagram showing a configuration example of the vehicle travel control device 200 according to the present embodiment. The vehicle travel control device 200 is provided with a second information acquisition device 210, a second control device 220, a second input/output interface 230, and a travel device 240.

The second information acquisition device 210 acquires second driving environment information 250. The second driving environment information 250 is information indicating a driving environment for the vehicle 1 and necessary for the vehicle travel control and the travel assist control by the vehicle travel control device 200.

Figure 9:
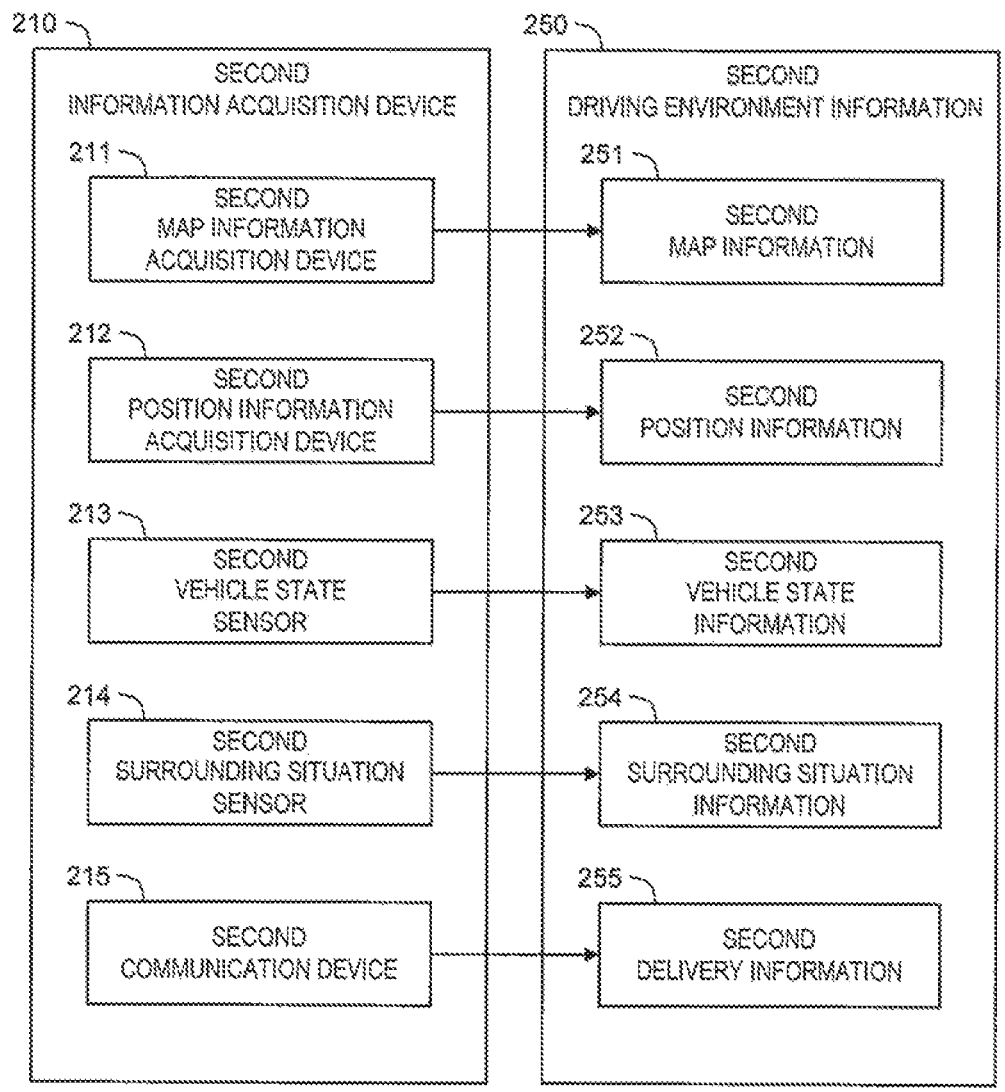
FIG. 9 is a block diagram showing an example of a second information acquisition device and second driving environment information in the vehicle travel control device according to the embodiment of the present disclosure.

FIG. 9 is a block diagram showing an example of the second information acquisition device 210 and the second driving environment information 250. The second information acquisition device 210 includes a second map information acquisition device 211, a second position information acquisition device 212, a second vehicle state sensor 213, a second surrounding situation sensor 214, and a second communication device 215. The second driving environment information 250 includes second map information 251, second position information 252, second vehicle state information 253, second surrounding situation information 254, and second delivery information 255.

The second map information acquisition device 211 acquires the second map information 251. The second map information 251 indicates a lane configuration and a road shape. The second map information acquisition device 211 acquires the second map information 251 of a necessary area from a map database. The map database may be stored in a predetermined memory device mounted on the vehicle 1, or may be stored in a management server outside the vehicle 1. In the latter case, the second map information acquisition device 211 communicates with the management server to acquire the necessary second map information 251.

The second position information acquiring device 212 acquires the second position information 252 indicating a position and an orientation of the vehicle 1. For example, the second position information acquiring device 212 includes a GPS device for measuring the position and the orientation of the vehicle 1. The second position information acquisition device 212 may perform well-known localization to increase accuracy of the second position information 252.

The second vehicle state sensor 213 acquires the second vehicle state information 253 indicating a state of the vehicle 1. For example, the second vehicle state sensor 213 includes a vehicle speed sensor, a yaw rate sensor, an acceleration sensor, a steering angle sensor, and the like. The vehicle speed sensor detects a vehicle speed (i.e., a speed of the vehicle 1). The yaw rate sensor detects a yaw rate of the vehicle 1. The acceleration sensor detects an acceleration (e.g., a lateral acceleration, a longitudinal acceleration, a vertical acceleration) of the vehicle 1. The steering angle sensor detects a steering angle (a wheel turning angle) of the vehicle 1.

The second surrounding situation sensor 214 recognizes (detects) a situation around the vehicle 1. For example, the second surrounding situation sensor 214 includes at least one of a camera, a LIDAR, and a radar. The second surrounding situation information 254 indicates a result of recognition by the second surrounding situation sensor 214. For example, the second surrounding situation information 254 includes target information about a target recognized by the second surrounding situation sensor 214. The target is exemplified by a surrounding vehicle, a pedestrian, a roadside structure, an obstacle, a white line (lane marking), and the like. The target information includes information on a relative position and a relative velocity of the target with respect to the vehicle 1.

The second communication device 215 communicates with the outside of the vehicle 1. For example, the second communication device 215 communicates with an external device outside of the vehicle 1 via a communication network. The second communication device 215 may perform V2I communication (vehicle-to-infrastructure communication) with a surrounding infrastructure. The second communication device 215 may perform V2V communication (vehicle-to-vehicle communication) with a surrounding vehicle. The second delivery information 255 is information acquired through the second communication device 215. For example, the second delivery information 255 includes information on the surrounding vehicle and road traffic information (e.g., road work zone information, accident information, traffic restriction information, traffic jam information, etc.).

It should be noted that the first information acquisition device 110 and the second information acquisition device 210 may be partially identical. For example, the first map information acquisition device 111 and the second map information acquisition device 211 may be identical. The first position information acquisition device 112 and the second position information acquisition device 212 may be identical. The first vehicle state sensor 113 and the second vehicle state sensor 213 may be identical. That is to say, the automated driving control device 100 and the vehicle travel control device 200 may share a part of the second information acquisition device 210. In that case, the automated driving control device 100 and the vehicle travel control device 200 exchange necessary information with each other.

Referring again to FIG. 8, the second input/output interface 230 is communicably connected with the automated driving control device 100.

The travel device 240 includes a steering device 241, a driving device 242, and a braking device 243. The steering device 241 turns (i.e., changes a direction of) a wheel of the vehicle 1. For example, the steering device 241 includes a power steering (EPS: Electric Power Steering) device. The driving device 242 is a power source that generates a driving force. The driving device 242 is exemplified by an engine, an electric motor, an in-wheel motor, and the like. The braking device 243 generates a braking force.

The second control device 220 (i.e., a second controller) is an information processing device for executing a variety of processing. For example, the second control device 220 is a microcomputer. The second control device 220 is also called an ECU. More specifically, the second control device 220 includes a second processor 221 and a second memory device 222.

A variety of information is stored in the second memory device 222. For example, the second driving environment information 250 acquired by the second information acquisition device 210 is stored in the second memory device 222. The second memory device 222 is exemplified by a volatile memory, a nonvolatile memory, an HDD, and the like.

The second processor 221 executes vehicle travel control software which is a computer program. The vehicle travel control software is stored in the second memory device 222 or recorded on a computer-readable recording medium. The functions of the second control device 220 (the second processor 221) are realized by the second processor 221 executing the vehicle travel control software.

3-2. Vehicle Travel Control

The second control device 220 (the second processor 221) executes the "vehicle travel control" that controls the steering, the acceleration, and the deceleration of the vehicle 1. The second control device 220 executes the vehicle travel control by controlling an operation of the travel device 240. More specifically, the second control device 220 controls the steering (turning of the wheel) of the vehicle 1 by controlling an operation of the steering device 241. The second control device 220 controls the acceleration of the vehicle 1 by controlling an operation of the driving device 242. The second control device 220 controls the deceleration of the vehicle 1 by controlling an operation of the braking device 243.

In particular, the second control device 220 executes the vehicle travel control such that the vehicle 1 follows the target trajectory TR. In this case, the second control device 220 calculates a deviation between the vehicle 1 and the target trajectory TR based on the target trajectory TR, the second position information 252, and the second vehicle state information 253. The deviation includes a lateral deviation (i.e., an Y-direction deviation), a yaw angle deviation (i.e., an azimuth angle deviation), and a velocity deviation. Then, the second control device 220 performs the vehicle travel control such that the deviation between the vehicle 1 and the target trajectory TR decreases.

In the vehicle travel control, the second control device 220 calculates a control amount for controlling the travel device 240, that is, a control amount of at least one of the steering, the acceleration, and the deceleration. The control amount required for the vehicle 1 to follow the target trajectory TR, that is, the control amount required for reducing the deviation between the vehicle 1 and the target trajectory TR is hereinafter referred to as a "required control amount CON." The required control amount CON is exemplified by a target steering angle, a target yaw rate, a target velocity, a target acceleration, a target deceleration, a target torque, a target current, and the like. The second control device 220 controls the operation of the travel device 240, that is, controls at least one of the steering, the acceleration, and the deceleration in accordance with the required control amount CON.

For example, the steering control using the steering device 241 is as follows. The second control device 220 calculates a target yaw rate required for reducing the deviation between the vehicle 1 and the target trajectory TR. Furthermore, the second control device 220 calculates a target steering angle according to a yaw rate deviation which is a difference between the target yaw rate and an actual yaw rate. The actual yaw rate is detected by the second vehicle state sensor 213 and included in the second vehicle state information 253. The target steering angle becomes larger as the yaw rate deviation becomes larger. Then, the second control device 220 performs feedback control of the steering device 241 such that an actual steering angle follows the target steering angle. The actual steering angle is detected by the second vehicle state sensor 213 and included in the second vehicle state information 253.

3-3. Processing Related to Travel Assist Control

The second control device 220 (the second processor 221) further executes the "travel assist control" that assists the travel of the vehicle 1. The travel assist control controls at least one of the steering, the acceleration, and the deceleration of the vehicle 1 for at least one of improving safety or comfort of the travel of the vehicle 1, reducing a sense of strangeness or insecurity of an occupant of the vehicle 1, and stabilizing behavior of the vehicle 1. The travel assist control is exemplified by collision avoidance control, lane departure suppression control, damping control, vehicle stability control, and the like. The collision avoidance control assists avoidance of a collision between the vehicle 1 and a surrounding object (namely, an avoidance target). The lane departure suppression control suppresses the vehicle 1 from departing from a travel lane. The damping control suppresses pitching and rolling of the vehicle 1. The vehicle stability control suppresses unstable behavior such as vehicle spin.

Figure 10:
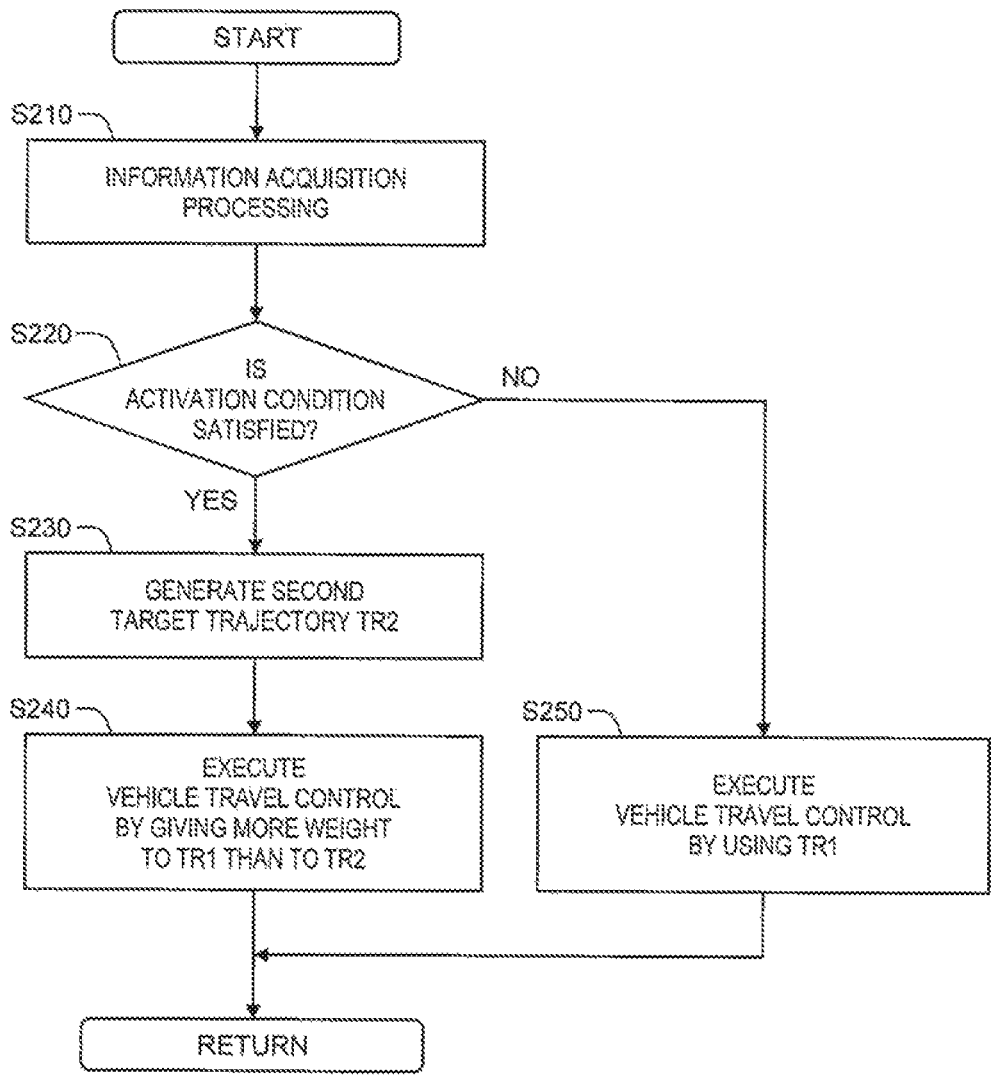
FIG. 10 is a flow chart showing an example of processing related to travel assist control by the vehicle travel control device according to the embodiment of the present disclosure.

FIG. 10 is a flow chart showing an example of processing related to the travel assist control by the second control device 220 (the second processor 221). The process flow shown in FIG. 10 is repeatedly executed at a regular interval. Here, the automated driving of the vehicle 1 is in execution.

3-3-1. Step S210

In Step S210, the second control device 220 acquires the second driving environment information 250 from the second information acquisition device 210. The second driving environment information 250 is stored in the second memory device 222. Moreover, the second control device 220 receives information indicating the first target trajectory TR1 from the automated driving control device 100 via the second input/output interface 230. The information indicating the first target trajectory TR1 is stored in the second memory device 222.

3-3-2. Step S220

In Step S220, the second control device 220 determines whether or not the travel assist control needs to be activated based on the second driving environment information 250. In other words, the second control device 220 determines whether or not the "activation condition" for activating the travel assist control is satisfied, based on the second driving environment information 250.

As an example of the travel assist control, let us consider the collision avoidance control. Based on the second surrounding situation information 254 (the target information), the second control device 220 recognizes an avoidance target (e.g., a surrounding vehicle, a pedestrian) ahead of the vehicle 1. Furthermore, based on the second vehicle state information 253 and the second surrounding situation information 254 (the target information), the second control device 220 predicts respective future positions of the vehicle 1 and the avoidance target and calculates a possibility that the vehicle 1 collides with the avoidance target. The activation condition of the collision avoidance control is that the possibility that the vehicle 1 collides with the avoidance target is equal to or higher than a threshold.

As another example of the travel assist control, let us consider the lane departure suppression control. For example, when the vehicle 1 wobbles within the travel lane and comes close to a lane marking (a white line) of the travel lane, the lane departure suppression control steers the vehicle 1 so as to return back to a center of the travel lane. For that purpose, the second control device 220 recognizes, based on the second surrounding situation information 254, the lane marking of the travel lane in which the vehicle 1 is traveling and monitors a distance between the vehicle 1 and the lane marking. A first activation condition of the lane departure suppression control is that the distance between the vehicle 1 and the lane marking of the travel lane becomes less than a predetermined distance threshold.

In addition, the lane departure suppression control decelerates the vehicle 1 when predicting that the vehicle 1 is not able to turn a curve located ahead of the vehicle 1. For that purpose, the second control device 220 acquires a road shape in front of the vehicle 1 based on the second map information 251 and the second position information 252. Then, the second control device 220 determines, based on the road shape and the second vehicle state information 253 (the vehicle speed, etc.), whether or not the vehicle 1 is able to turn the curve located ahead of the vehicle 1 without departing from the travel lane. At this time, the second control device 220 may perform the determination in consideration of a road surface condition (a road surface friction coefficient). The road surface condition can be estimated by a well-known technique utilizing the second vehicle state information 253 or the second surrounding situation information 254. A second activation condition of the lane departure suppression control is that it is determined that the vehicle 1 is not able to turn the curve located ahead of the vehicle 1 without departing from the travel lane.

When the activation condition of the travel assist control is satisfied (Step S220; Yes), the processing proceeds to Step S230. On the other hand, when the activation condition of the travel assist control is not satisfied (Step S220; No), the processing proceeds to Step S250.

3-3-3. Step S230

The second control device 220 generates the second target trajectory TR2 for the travel assist control. For example, the second target trajectory TR2 for the collision avoidance control demands at least one of the steering and the deceleration of the vehicle 1 in order to avoid the collision with the avoidance target.

As another example, when the first activation condition of the lane departure suppression control is satisfied, the second target trajectory TR2 demands such the steering that returns the vehicle 1 back to the center of the travel lane. When the second activation condition of the lane departure suppression control is satisfied, the second target trajectory TR2 demands the deceleration of the vehicle 1 in order to suppress lane departure at the curve ahead.

The second control device 220 stores information of the second target trajectory TR2 in the second memory device 222. After that, the processing proceeds to Step S240.

3-3-4. Step S240

Both the first target trajectory TR1 for the automated driving and the second target trajectory TR2 for the travel assist control exist coincidentally. Therefore, the second control device 220 arbitrates between the first target trajectory TR1 and the second target trajectory TR2. In particular, according to the present embodiment, the second control device 220 executes the vehicle travel control by giving more priority to the first target trajectory TR1 than to the second target trajectory TR2. In other words, the second control device 220 executes the vehicle travel control by giving more "weight" to the first target trajectory TR1 than to the second target trajectory TR2.

Figure 11:
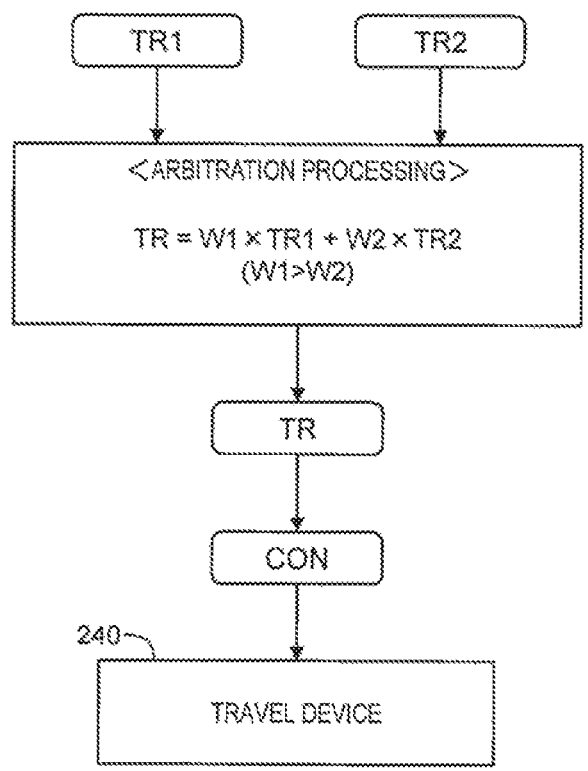
FIG. 11 is a conceptual diagram showing an example of processing in Step S240 in FIG. 10.

FIG. 11 is a conceptual diagram showing an example of the processing in Step S240. The second control device 220 performs arbitration processing that determines a definitive target trajectory TR based on the first target trajectory TR1 and the second target trajectory TR2. The target trajectory TR is expressed by the following Equation (1).

$$TR = W1 \times TR1 + W2 \times TR2 \quad \text{Equation (1):}$$

A first weight W1 is a weight of the first target trajectory TR1 with respect to the target trajectory TR. A second weight W2 is a weight of the second target trajectory TR2 with respect to the target trajectory TR. The first weight W1 is greater than the second weight W2 (i.e., W1>W2). In other words, the first weight W1 is greater than 0.5 and equal to or less than 1, and the second weight W2 is equal to or greater than 0 and less than 0.5. The first weight W1 being 1 and the second weight W2 being 0 are equivalent to that the first target trajectory TR1 is selected as the target trajectory TR.

The second control device 220 calculates the required control amount CON required for the vehicle 1 to follow the target trajectory TR. Then, the second control device 220 controls the operation of the travel device 240, that is, controls at least one of the steering, the acceleration, and the deceleration in accordance with the required control amount CON.

Figure 12:
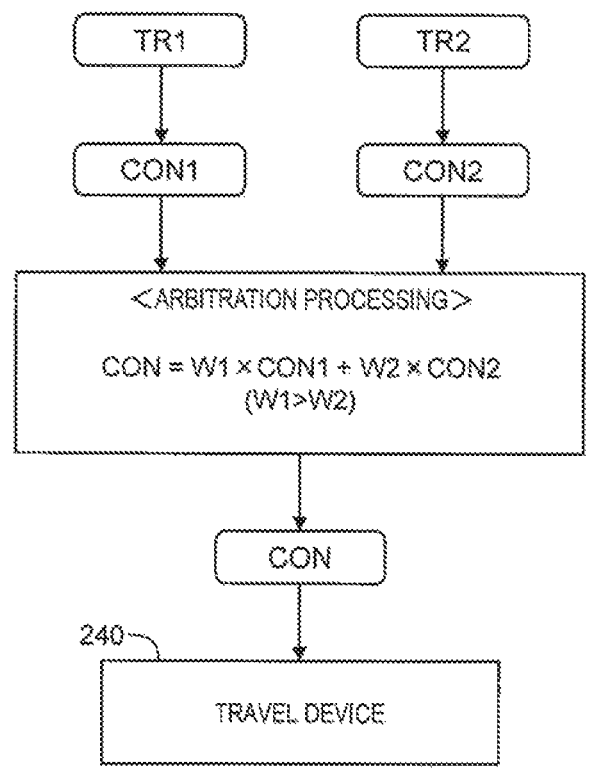
FIG. 12 is a conceptual diagram showing another example of processing in Step S240 in FIG. 10.

FIG. 12 is a conceptual diagram showing another example of the processing in Step S240. The processing shown in FIG. 12 also is included in "the executing the vehicle travel control by giving more weight to the first target trajectory TR1 than to the second target trajectory TR2."

More specifically, the second control device 220 calculates the required control amount CON required for the vehicle 1 to follow the first target trajectory TR1 as a "first required control amount CON1." In addition, the second control device 220 calculates the required control amount CON required for the vehicle 1 to follow the second target trajectory TR2 as a "second required control amount CON2." Then, the second control device 220 performs arbitration processing that determines a definitive required control amount CON by combining the first required control amount CON1 and the second required control amount CON2. The required control amount CON is expressed by the following Equation (2).

$$CON = W1 \times CON1 + W2 \times CON2 \quad \text{Equation (2):}$$

A first weight W1 is a weight of the first required control amount CON1 with respect to the required control amount CON. A second weight W2 is a weight of the second required control amount CON2 with respect to the required control amount CON. The first weight W1 is greater than the second weight W2 (i.e., W1>W2). In other words, the first weight W1 is greater than 0.5 and equal to or less than 1, and the second weight W2 is equal to or greater than 0 and less than 0.5. The first weight W1 being 1 and the second weight W2 being 0 are equivalent to that the first required control amount CON1 is selected as the required control amount CON.

When the required control amount CON is determined, the second control device 220 controls the operation of the travel device 240, that is, controls at least one of the steering, the acceleration, and the deceleration in accordance with the required control amount CON. The processing shown in FIG. 12 also brings about the same effects as in the case of FIG. 11.

3-3-5. Step S250

The activation condition of the travel assist control is not satisfied, and thus the second target trajectory TR2 is not generated. The second control device 220 executes the vehicle travel control by using the first target trajectory TR1 received from the automated driving control device 100 as the target trajectory TR. That is, the second control device 220 executes the vehicle travel control such that the vehicle 1 follows the first target trajectory TR1.

Figure 13:
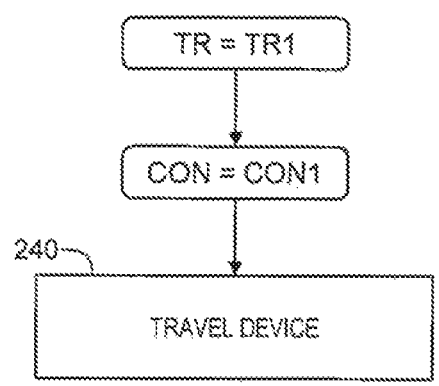
FIG. 13 is a conceptual diagram showing an example of processing in Step S250 in FIG. 10.

FIG. 13 is a conceptual diagram showing the processing in Step S250. The second control device 220 calculates the required control amount CON (=CON1) required for the vehicle 1 to follow the target trajectory TR (=TR1). Then, the second control device 220 controls the operation of the travel device 240, that is, controls at least one of the steering, the acceleration, and the deceleration in accordance with the required control amount CON (=CON1).

4. PRIORITY CONDITION

There is no need to always give priority to the first target trajectory TR1. In order to make more flexible operation possible, the priority may be conditionally given to the first target trajectory TR1. Hereinafter, a case where a "priority condition" for giving priority to the first target trajectory TR1 is taken into consideration will be described.

Figure 14:
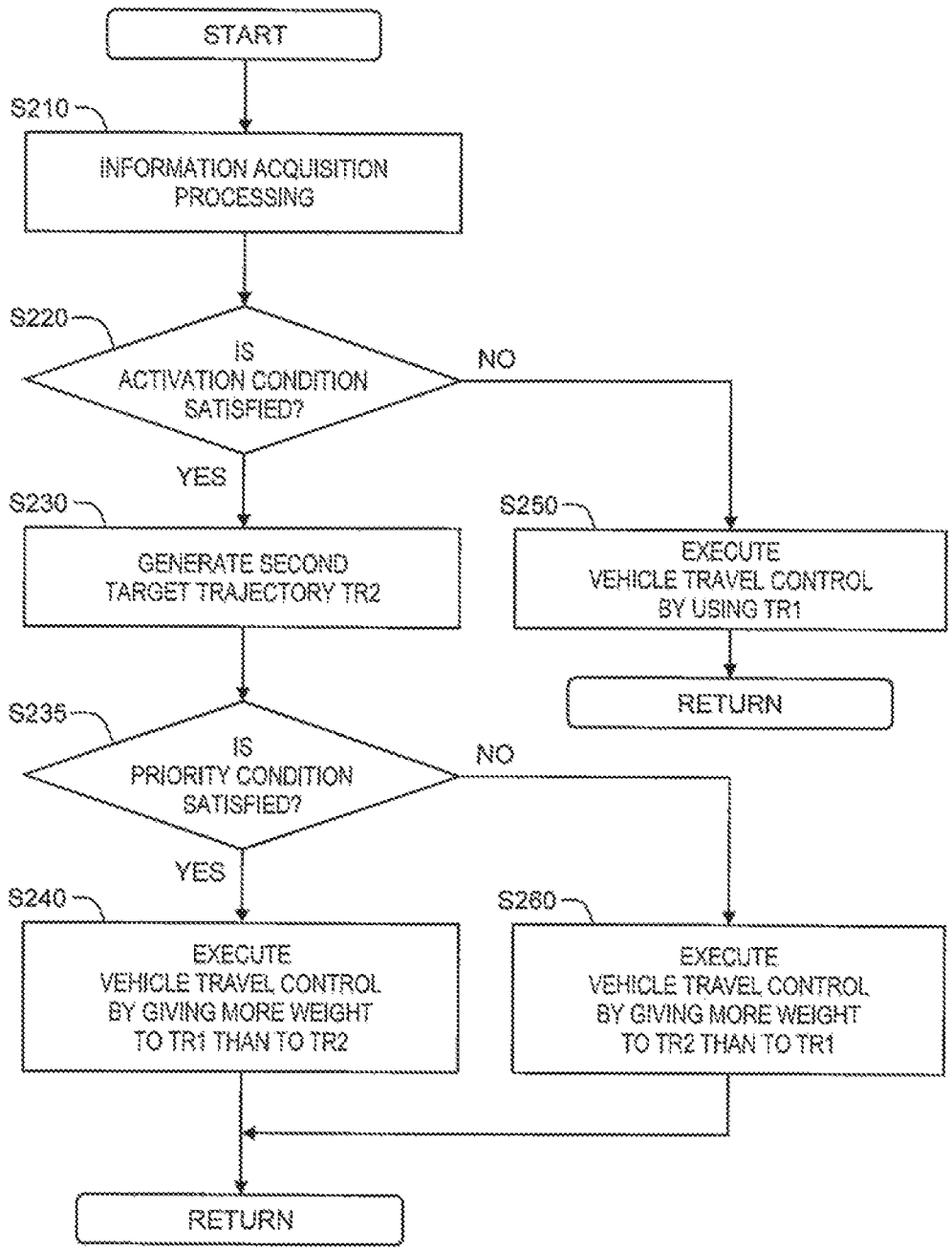
FIG. 14 is a flow chart showing another example of processing related to the travel assist control by the vehicle travel control device according to the embodiment of the present disclosure.

FIG. 14 is a flow chart showing the processing related to the travel assist control in the case where the priority condition is taken into consideration. An overlapping description with the foregoing FIG. 10 will be omitted as appropriate. Compared to the foregoing FIG. 10, Step S235 and Step S260 are added after Step S230.

In Step S235, the second control device 220 determines whether or not the priority condition for giving priority to the first target trajectory TR1 is satisfied. When the priority condition is satisfied (Step S235; Yes), the processing proceeds to Step S240.

On the other hand, when the priority condition is not satisfied (Step S235; No), the processing proceeds to Step S260. In Step S260, the second control device 220 executes the vehicle travel control by giving more priority to the second target trajectory TR2 than to the first target trajectory TR1. In other words, the second control device 220 executes the vehicle travel control by giving more weight to the second target trajectory TR2 than to the first target trajectory TR1. For example, the second control device 220 executes the vehicle travel control by using the second target trajectory TR2 as the target trajectory TR. As a result, the effects of the travel assist control are sufficiently obtained.

In this manner, the priority is not always but conditionally given to the first target trajectory TR1. It is therefore possible to suppress decrease in the continuity of the automated driving while appropriately utilizing the travel assist control.

Hereinafter, various examples of the priority condition will be described. It should be noted that the priority condition may include two or more of the various examples described below as long as no contradiction occurs. When at least any priority condition is satisfied (Step S235; Yes), the processing proceeds to Step S240.

4-1. First Example

In the following description, a "first steering direction" is a steering direction required for the vehicle 1 to follow the first target trajectory TR1, that is, a steering direction required by the automated driving control device 100. On the other hand, a "second steering direction" is a steering direction required for the vehicle 1 to follow the second target trajectory TR2, that is, the steering direction required by the travel assist control.

A first example of the priority condition is that "the first steering direction is the same as the second steering direction." When this priority condition is satisfied, the automated driving control device 100 is considered to recognize risks from the same point of view as the travel assist control. Giving priority to the first target trajectory TR1 required by the automated driving control device 100 makes it possible to secure the continuity of the automated driving while achieving equivalent effects as in the case of the travel assist control.

The second control device 220 can determine whether or not the first steering direction is the same as the second steering direction by comparing the second position information 252 (i.e., the position and orientation of the vehicle 1), the first target trajectory TR1, and the second target trajectory TR2. Alternatively, the second control device 220 may calculate the first required control amount CON1 and the second required control amount CON2 described above and compare the first required control amount CON1 and the second required control amount CON2 to determine whether or not the first steering direction is the same as the second steering direction. In the present example, the first required control amount CON1 includes a first steering control amount for steering in the first steering direction, and the second required control amount CON2 includes a second steering control amount for steering in the second steering direction.

4-2. Second Example

A second example of the priority condition is that "the first steering direction is opposite to the second steering direction." When this priority condition is satisfied, there is a possibility that the travel assist control function GD of the vehicle travel control device 200 has low performance. Giving priority to the first target trajectory TR1 required by the automated driving control device 100 makes it possible to suppress influence of the low-performance travel assist and to suppress decrease in the continuity of the automated driving.

The second control device 220 can determine whether or not the first steering direction is opposite to the second steering direction by comparing the second position information 252, the first target trajectory TR1, and the second target trajectory TR2. Alternatively, the second control device 220 may determine whether or not the first steering direction is opposite to the second steering direction by comparing the first required control amount CON1 and the second required control amount CON2.

4-3. Third Example

Here, a case where the target trajectory TR includes not only the target position [Xi, Yi] of the vehicle 1 but also the target velocity [VXi, VYi] (see FIG. 1) is considered. A third example of the priority condition is that "deceleration is required to follow the first target trajectory TR1, and deceleration is also required to follow the second target trajectory TR2 as well." When this priority condition is satisfied, the automated driving control device 100 is considered to recognize risks from the same point of view as the travel assist control. Giving priority to the first target trajectory TR1 required by the automated driving control device 100 makes it possible to secure the continuity of the automated driving while achieving equivalent effects as in the case of the travel assist control.

The second control device 220 can determine whether or not the third example of the priority condition is satisfied by comparing the second vehicle state information 253 (i.e., the vehicle speed), the first target trajectory TR1, and the second target trajectory TR2. Alternatively, the second control device 220 may calculate the first required control amount CON1 and the second required control amount CON2 described above and compare the first required control amount CON1 and the second required control amount CON2 to determine whether or not the third example of the priority condition is satisfied. In the present example, the first required control amount CON1 includes a first deceleration control amount for decelerating, and the second required control amount CON2 includes a second deceleration control amount for decelerating.

4-4. Fourth Example

A fourth example of the priority condition is that "deceleration is required to follow the first target trajectory TR1 and acceleration is required to follow the second target trajectory TR2." When this priority condition is satisfied, there is a possibility that the travel assist control function GD of the vehicle travel control device 200 has low performance. Giving priority to the first target trajectory TR1 makes it possible to suppress influence of the low-performance travel assist and to suppress decrease in the continuity of the automated driving.

The second control device 220 can determine whether or not the fourth example of the priority condition is satisfied by comparing the second vehicle state information 253 (i.e., the vehicle speed), the first target trajectory TR1, and the second target trajectory TR2. Alternatively, the second control device 220 may determine whether or not the fourth example of the priority condition is satisfied by comparing the first required control amount CON1 and the second required control amount CON2.

4-5. Fifth Example

A fifth example is a modification of the third example. In the following description, a "first deceleration" is a deceleration required for the vehicle 1 to follow the first target trajectory TR1, that is, a deceleration required by the automated driving control device 100. On the other hand, a "second deceleration" is a deceleration required for the vehicle 1 to follow the second target trajectory TR2, that is, a deceleration required by the travel assist control.

In the fifth example, a case where the second deceleration is equal to or higher than a deceleration threshold is considered in particular. The deceleration threshold is an upper limit of a deceleration range desired in terms of stable behavior of the vehicle 1. When the second deceleration is equal to or higher than the deceleration threshold, the travel assist control function GD of the vehicle travel control device 200 is considered to have low performance.

In view of the above, a fifth example of the priority condition is that "the second deceleration is equal to or higher than the deceleration threshold and the first deceleration is lower than the second deceleration." Giving priority to the first deceleration (i.e., the first target trajectory TR1) makes it possible to relax the high deceleration state and suppress unstable behavior of the vehicle 1.

The second control device 220 calculates the first required control amount CON1 and the second required control amount CON2. The first required control amount CON1 includes a first deceleration control amount for generating the first deceleration. The second required control amount CON2 includes a second deceleration control amount for generating the second deceleration. The second control device 220 can determine whether or not the fifth example of the priority condition is satisfied by comparing the first required control amount CON1 and the second required control amount CON2.

4-6. Sixth Example

In the fifth example described above, it is also possible to replace the deceleration with a lateral acceleration (lateral G). In the following description, a "first lateral acceleration" is a lateral acceleration required for the vehicle 1 to follow the first target trajectory TR1, that is, a lateral acceleration required by the automated driving control device 100. On the other hand, a "second lateral acceleration" is a lateral acceleration required for the vehicle 1 to follow the second target trajectory TR2, that is, a lateral acceleration required by the travel assist control. A lateral acceleration threshold is an upper limit of a lateral acceleration range desired in terms of stable behavior of the vehicle 1. When the second lateral acceleration is equal to or higher than the lateral acceleration threshold, the travel assist control function GD of the vehicle travel control device 200 is considered to have low performance.

A sixth example of the priority condition is that "the second lateral acceleration is equal to or higher than the lateral acceleration threshold and the first lateral acceleration is lower than the second lateral acceleration." Giving priority to the first lateral acceleration (i.e., the first target trajectory TR1) makes it possible to relax the high lateral acceleration state and suppress unstable behavior of the vehicle 1.

The second control device 220 calculates the first required control amount CON1 and the second required control amount CON2. The first required control amount CON1 includes a first travel control amount for generating the first lateral acceleration. The second required control amount CON2 includes a second travel control amount for generating the second lateral acceleration. The second control device 220 can determine whether or not the sixth example of the priority condition is satisfied by comparing the first required control amount CON1 and the second required control amount CON2.

4-7. Seventh Example

A seventh example of the priority condition includes that "the second required control amount CON2 is less than a predetermined value or the first required control amount CON1." For example, the seventh example of the priority condition includes that "the second deceleration is lower than a predetermined deceleration or the first deceleration." As another example, the seventh example of the priority condition includes that "the second lateral acceleration is lower than a predetermined lateral acceleration or the first lateral acceleration." Similarly, the seventh example of the priority condition includes that "a second steering angle required to follow the second target trajectory TR2 is less than a predetermined steering angle or a first steering angle required to follow the first target trajectory TR1."

When the second required control amount CON2 is less than the predetermined value or the first required control amount CON1, it is considered that urgency of the travel assist control is low and the travel assist control has limited effectiveness. Giving priority to the first required control amount CON1 (i.e., the first target trajectory TR1) makes it possible to suppress influence of the travel assist and to suppress decrease in the continuity of the automated driving.

The second control device 220 calculates the first required control amount CON1 and the second required control amount CON2. Then, the second control device 220 determines whether or not the seventh example of the priority condition is satisfied by comparing the first required control amount CON1 and the second required control amount CON2.

4-8. Eighth Example

An eighth example of the priority condition includes that "the first required control amount CON1 is less than the second required control amount CON2." For example, the eighth example of the priority condition includes that "the first deceleration is lower than the second deceleration." As another example, the eighth example of the priority condition includes that "the first lateral acceleration is lower than the second lateral acceleration." Similarly, the eighth example of the priority condition may include that "the first steering angle required to follow the first target trajectory TR1 is smaller than the second steering angle required to follow the second target trajectory TR2."

A fact that the first required control amount CON1 is less than the second required control amount CON2 means that the second required control amount CON2 is unnecessarily excessive. Giving priority to the first required control amount CON1 (i.e., the first target trajectory TR1) makes it possible to suppress influence of the travel assist and to suppress decrease in the continuity of the automated driving.

The second control device 220 calculates the first required control amount CON1 and the second required control amount CON2. Then, the second control device 220 determines whether or not the eighth example of the priority condition is satisfied by comparing the first required control amount CON1 and the second required control amount CON2.

4-9. Ninth Example

In the following description, first reliability is reliability of the automated driving control device 100. Second reliability is reliability of the travel assist control by the vehicle travel control device 200. A ninth example of the priority condition is that "the first reliability is higher than the second reliability." Giving priority to the first target trajectory TR1 makes it possible to suppress influence of the low-reliability travel assist and to suppress decrease in the continuity of the automated driving.

Various examples can be considered as a method of calculating the reliability. For example, the reliability is calculated from a sensor configuration and a sensor performance of each of the automated driving control device 100 and the vehicle travel control device 200.

The first information acquisition device 110 of the automated driving control device 100 includes the first surrounding situation sensor 114 (see FIGS. 5 and 6). The sensor that can be used as the first surrounding situation sensor 114 is exemplified a cameras, a LIDAR, a radar, a sonar, and so forth. The first reliability increases as the number of types of the sensors included in the first surrounding situation sensor 114 increases. The first reliability increases as the number of sensors of the same type included in the first surrounding situation sensor 114 increases. For example, when the first surrounding situation sensor 114 includes a plurality of cameras for imaging the front, rear, left, and right directions of the vehicle 1, respectively, the first reliability becomes high. The first reliability increases as the performance (e.g., a field of view, resolution, effective range, spatial resolution, etc.) of each sensor included in the first surrounding situation sensor 114 becomes higher. The first reliability is calculated in advance by the use of a predetermined map or the like. Alternatively, the first reliability may be calculated in real time based on a state (normal/failure) of each sensor included in the first surrounding situation sensor 114. The first reliability may be a numerical value or may be a rank (level).

On the other hand, the second information acquisition device 210 of the vehicle travel control device 200 includes the second surrounding situation sensor 214 (see FIGS. 8 and 9). The second reliability of the second surrounding situation sensor 214 can be calculated as in the case of the first reliability of the first surrounding situation sensor 114.

The second control device 220 acquires first reliability information indicating the first reliability of the automated driving control device 100. For example, the first reliability information is provided in advance from a developer of the automated driving control device 100. As another example, the first control device 120 of the automated driving control device 100 may calculate the first reliability and transmit the first reliability information to the vehicle travel control device 200 through the first input/output interface 130. As yet another example, the first control device 120 of the automated driving control device 100 may transmit information necessary for calculating the first reliability to the vehicle travel control device 200 through the first input/output interface 130. In that case, the second control device 220 calculates the first reliability based on the information received from the automated driving control device 100 to generate the first reliability information. The first reliability information is stored in the second memory device 222.

Moreover, the second control device 220 acquires second reliability information indicating the second reliability of the travel assist control. For example, the second reliability information is provided in advance from a developer of the vehicle travel control device 200. As another example, the second control device 220 may calculate the second reliability and generate the second reliability information. The second reliability information is stored in the second memory device 222. Then, the second control device 220 determines whether or not the first reliability is higher than the second reliability by comparing the first reliability information and the second reliability information.

4-10. Tenth Example

Here, as an example of the travel assist control, let us consider the collision avoidance control that assists avoidance of a collision between the vehicle 1 and a surrounding object. When the activation condition of the collision avoidance control is satisfied, the second control device 220 predicts severity of damage due to the collision based on the second driving environment information 250.

For example, the severity increases as the relative velocity between the vehicle 1 and the object (avoidance target) becomes higher. The severity when the object is a human is higher than the severity when the object is a non-human. If hardness and/or a size of the object is identified based on a result of detection of the object, information thereof may be taken into consideration. A collision form (front collision, offset collision, side collision, etc.) may be taken into consideration. The severity may be calculated by the use of a predetermined map. The severity may be a numerical value or may be a rank (level).

A tenth example of the priority condition is that "the severity of damage due to the collision between the vehicle 1 and the surrounding object is less than a threshold." In other words, the tenth example of the priority condition is that "influence of the collision between the vehicle 1 and the surrounding object is negligibly small." Giving priority to the first target trajectory TR1 makes it possible to suppress decrease in the continuity of the automated driving.

5. MODIFICATION EXAMPLES 5-1. First Modification Example

The activation condition of the travel assist control in Step S220 may be variably set according to an operating state of the vehicle 1.

As an example, let us consider a case where a driver operates the vehicle 1 manually. In this case, the travel assist control is expected to make up for the driver's mistake in the manual driving operation. However, if the travel assist control is activated too early, the manual driving operation by the driver is hindered and thus comfort is deteriorated. In view of the above, in the case of the manual driving, the activation condition is set so that the travel assist control is less likely to be activated as compared with the case of the automated driving. Moreover, the activation condition is set so that the travel assist control is more likely to be activated as the automated driving level becomes higher.

As another example, let us consider a case where an operator of a control center remotely controls the vehicle 1. In the case of the remote control, the operator recognizes an object by checking camera image transmitted from the vehicle 1 and the like, and issues an instruction to the vehicle 1. However, a delay and/or a mistake in the object recognition and the instruction timing may occur due to communication delay and/or limited camera performance (angle of view, resolution). In view of the above, in the case of the remote control, the activation condition is set so that the travel assist control is more likely to be activated as compared with the other cases.

5-2. Second Modification Example

In Step S230, the second control device 220 may directly calculate the control amount of the travel device 240 for the travel assist control without generating the second target trajectory TR2. The control amount of at least one of the steering, the acceleration, and the deceleration required for the travel assist control is hereinafter referred to as a "travel assist control amount." For example, the second control device 220 calculates the travel assist control amount of at least one of the steering and the deceleration required for avoiding a collision with the avoidance target. The travel assist control amount corresponds to the second required control amount CON2 described above.

The "second target trajectory TR2" in the above-described embodiment is replaced with the "travel assist control amount." That is, even when the travel assist control amount is calculated during the automated driving, the second control device 220 executes the vehicle travel control by giving more weight to the first target trajectory TR1 than to the travel assist control amount (Step S240). In other words, the second control device 220 executes the vehicle travel control by giving more weight to the first required control amount CON1 than to the travel assist control amount (see FIG. 12).

Alternatively, when the travel assist control amount is calculated during the automated driving, the second control device 220 determines whether or not the priority condition for giving priority to the first target trajectory TR1 is satisfied (Step S235). For example, the second control device 220 compares the first required control amount CON1 and the travel assist control amount to determine whether or not the priority condition is satisfied. When the priority condition is satisfied (Step S235; Yes), the second control device 220 executes the vehicle travel control by giving more weight to the first target trajectory TR1 than to the travel assist control amount (Step S240). On the other hand, when the priority condition is not satisfied (Step S235; No), the second control device 220 executes the vehicle travel control by giving more weight to the travel assist control amount than to the first target trajectory TR1 (Step S260).

The same effects as in the case of the above-described embodiment can be obtained even by the present modification example.

5-3. Third Modification Example

Figure 15:
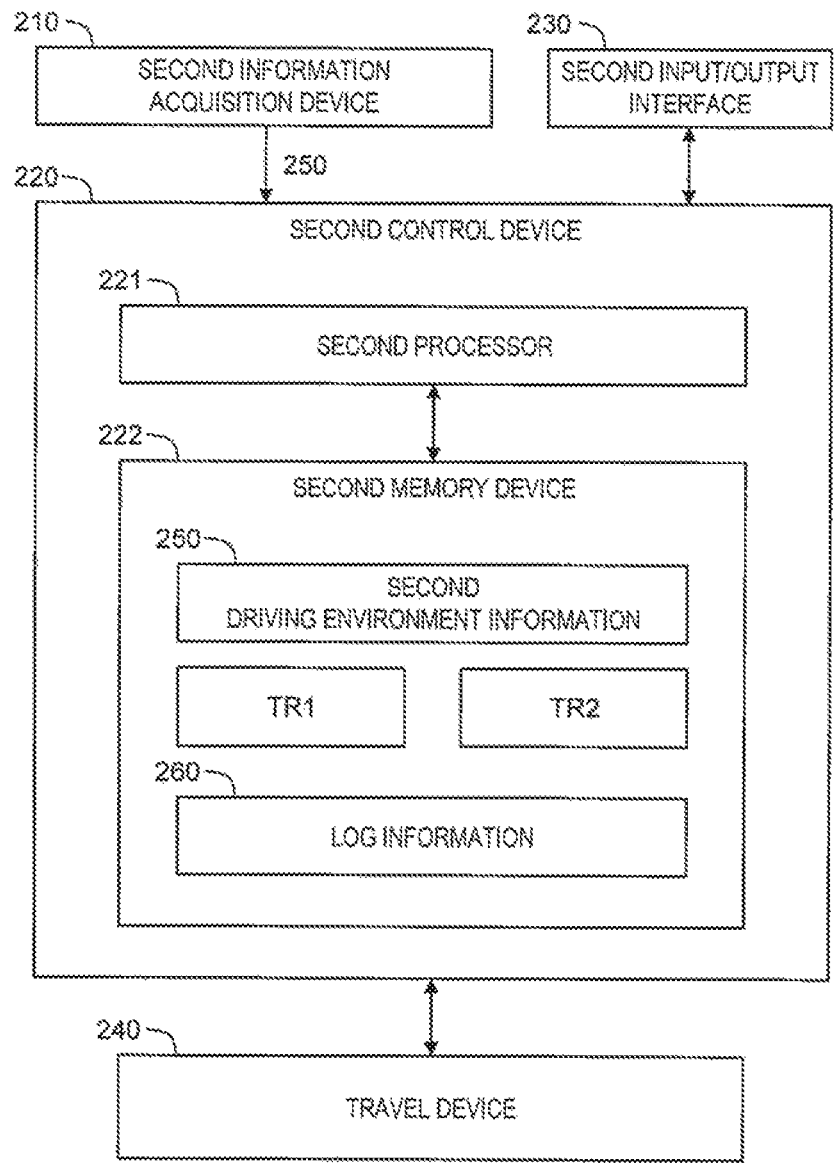
FIG. 15 is a block diagram showing a configuration of the vehicle travel control device according to a third modification example of the embodiment of the present disclosure.

FIG. 15 is a block diagram showing a configuration of the vehicle travel control device 200 according to a third modification example of the present embodiment. The second control device 220 (the second processor 221) generates log information 260 regarding the above-described Step S240 (see FIGS. 10 and 14), and stores the log information 260 in the second memory device 222.

The log information 260 includes at least a position where Step S240 has been executed. The log information 260 may include the first target trajectory TR1 and the second target trajectory TR2. The log information 260 may include the second driving environment information 250 acquired in a certain period of time including a timing when Step S240 has been executed.

Such the log information 260 is useful. For example, it is possible to exclude the position where Step S240 has been executed from an automated driving permitted zone (or ODD (Operational Design Domain)). As another example, it is possible to analyze a difference between the first target trajectory TR1 and the second target trajectory TR2. As yet another example, it is possible to analyze a reason of inconsistency between the first target trajectory TR1 and the second target trajectory TR2.

The second control device 220 may transmit the log information 260 to an automated driving management server through the second communication device 215. The automated driving management server performs setting of the automated driving permitted zone and various analyses based on the log information 260.

5-4. Fourth Modification Example

Figure 16:
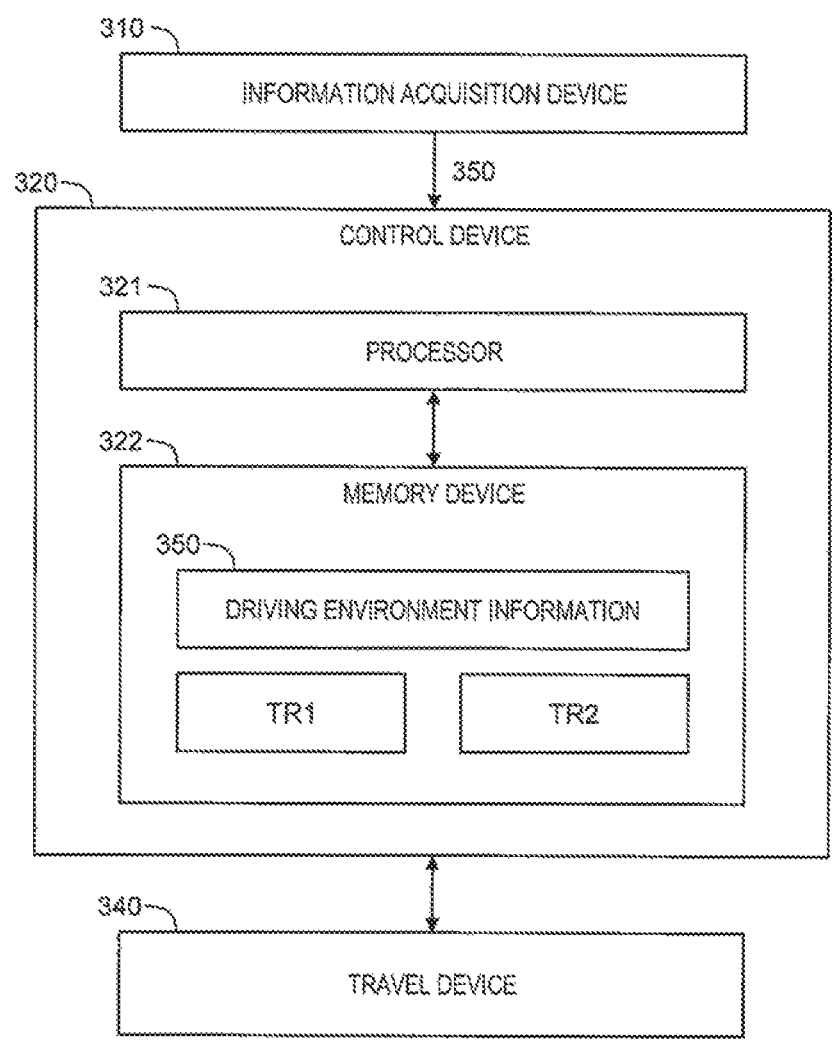
FIG. 16 is a block diagram showing a configuration of the vehicle control system according to a fourth modification example of the embodiment of the present disclosure.

FIG. 16 is a block diagram showing a configuration of the vehicle control system 10 according to a fourth modification example of the present embodiment. The vehicle control system 10 includes an information acquisition device 310, a control device 320, and a travel device 340.

The information acquisition device 310 acquires driving environment information 350. The information acquisition device 310 is the same as the first information acquisition device 110 or the second information acquisition device 210. The driving environment information 350 is the same as the first driving environment information 150 or the second driving environment information 250. The travel device 340 is the same as to the travel device 240.

The control device 320 includes a processor 321 and a memory device 322. A variety of information is stored in the memory device 322. For example, the driving environment information 350 acquired by the information acquisition device 310 is stored in the memory device 322. The processor 321 executes a control program. The control program is stored in the memory device 322 or recorded on a computer-readable recording medium. A variety of processing by the control device 320 is realized by the processor 321 executing the control program.

The control device 320 has both of the function of the first control device 120 of the automated driving control device 100 and the function of the second control device 220 of the vehicle travel control device 200. That is, the information acquisition device 310 and the control device 320 correspond to the automated driving control device 100, and the information acquisition device 310, the control device 320, and the ravel device 340 correspond to the vehicle travel control device 200.

A generalization is as follows. The vehicle control system 10 according to the present embodiment includes one processor (i.e., the processor 321) or a plurality of processors (i.e., the first processor 121 and the second processor 221). The one or more processors executes the processing as the automated driving control device 100 and the vehicle travel control device 200 based on the driving environment information stored in one or more memory devices.

What is claimed is:

1. A vehicle control system that controls a vehicle performing automated driving, the vehicle control system comprising:
    at least one processor configured to:
    execute vehicle travel control that controls steering, acceleration, and deceleration of the vehicle such that the vehicle follows a target trajectory; and
    generate a first target trajectory being the target trajectory for the automated driving of the vehicle, wherein
    at least one processor is further configured to:
        determine whether or not an activation condition of travel assist control is satisfied, wherein the travel assist control controls at least one of the steering, the acceleration, and the deceleration for at least one of improving safety or comfort of travel of the vehicle, reducing a sense of strangeness or insecurity of an occupant of the vehicle, and stabilizing behavior of the vehicle; and
        generate a second target trajectory being the target trajectory for the travel assist control when the activation condition is satisfied,
    even when the second target trajectory is generated during the automated driving, or when the second target trajectory is generated during the automated driving and a priority condition for giving priority to the first target trajectory is satisfied, execute the vehicle travel control by giving more weight to the first target trajectory than to the second target trajectory,
    wherein when the second target trajectory is generated during the automated driving, the at least one processor determines whether or not the priority condition for giving priority to the first target trajectory is satisfied, when the priority condition is satisfied, the at least one processor executes the vehicle travel control by giving more weight to the first target trajectory than to the second target trajectory, the priority condition includes that a first steering direction required for the vehicle to follow the first target trajectory is a same as a second steering direction required for the vehicle to follow the second target trajectory.

2. The vehicle control system according to claim 1, wherein
the priority condition includes that the deceleration is required for the vehicle to follow the first target trajectory and the deceleration is required for the vehicle to follow the second target trajectory.

3. The vehicle control system according to claim 1, wherein
the priority condition includes that the deceleration is required for the vehicle to follow the first target trajectory and the acceleration is required for the vehicle to follow the second target trajectory.

4. The vehicle control system according to claim 1, wherein
the priority condition includes that a second deceleration required for the vehicle to follow the second target trajectory is equal to or higher than a deceleration threshold and a first deceleration required for the vehicle to follow the first target trajectory is lower than the second deceleration.

5. The vehicle control system according to claim 1, wherein
the priority condition includes that a second lateral acceleration required for the vehicle to follow the second target trajectory is equal to or higher than a lateral acceleration threshold and a first lateral acceleration required for the vehicle to follow the first target trajectory is lower than the second lateral acceleration.

6. The vehicle control system according to claim 1, wherein
in the vehicle travel control, the at least one processor calculates a required control amount of at least one of the steering, the acceleration, and the deceleration required for the vehicle to follow the target trajectory, and controls the at least one of the steering, the acceleration, and the deceleration in accordance with the required control amount,
a first required control amount is the required control amount required for the vehicle to follow the first target trajectory,
a second required control amount is the required control amount required for the vehicle to follow the second target trajectory, and
the at least one processor compares the first required control amount and the second required control amount to determine whether or not the priority condition is satisfied.

7. The vehicle control system according to claim 1, wherein
in the vehicle travel control, the at least one processor calculates a required control amount of at least one of the steering, the acceleration, and the deceleration required for the vehicle to follow the target trajectory, and controls the at least one of the steering, the acceleration, and the deceleration in accordance with the required control amount,
a first required control amount is the required control amount required for the vehicle to follow the first target trajectory,
a second required control amount is the required control amount required for the vehicle to follow the second target trajectory, and
the priority condition includes that the second required control amount is less than a predetermined value or the first required control amount.

8. The vehicle control system according to claim 1, wherein
in the vehicle travel control, the at least one processor calculates a required control amount of at least one of the steering, the acceleration, and the deceleration required for the vehicle to follow the target trajectory, and controls the at least one of the steering, the acceleration, and the deceleration in accordance with the required control amount,
a first required control amount is the required control amount required for the vehicle to follow the first target trajectory,
a second required control amount is the required control amount required for the vehicle to follow the second target trajectory, and
the priority condition includes that the first required control amount is less than the second required control amount.

9. The vehicle control system according to claim 1, wherein
the at least one processor acquires first reliability information indicating first reliability being reliability of the automated driving and second reliability information indicating second reliability being reliability of the travel assist control, and
the priority condition includes that the first reliability is higher than the second reliability.

10. The vehicle control system according to claim 1, wherein
the travel assist control includes collision avoidance control that assists avoidance of a collision between the vehicle and a surrounding object,
the at least one processor determines whether or not the activation condition of the collision avoidance control is satisfied based on driving environment information indicating a driving environment for the vehicle,
when the activation condition is satisfied, the at least one processor predicts severity of damage due to the collision based on the driving environment information, and
the priority condition includes that the severity is less than a threshold.

11. The vehicle control system according to claim 1, wherein
when the priority condition is satisfied, the at least one processor executes the vehicle travel control by using the first target trajectory as the target trajectory.

12. The vehicle control system according to claim 1, wherein
in the vehicle travel control, the at least one processor calculates a required control amount of at least one of the steering, the acceleration, and the deceleration required for the vehicle to follow the target trajectory, and controls the at least one of the steering, the acceleration, and the deceleration in accordance with the required control amount, a first required control amount is the required control amount required for the vehicle to follow the first target trajectory, a second required control amount is the required control amount required for the vehicle to follow the second target trajectory, and the giving more weight to the first target trajectory than to the second target trajectory includes determining the required control amount by combining the first required control amount of a first weight and the second required control amount of a second weight less than the first weight.

13. The vehicle control system according to claim 1, further comprising a memory device, wherein the at least one processor stores log information in the memory device, and the log information includes at least a position where the at least one processor executes the vehicle travel control by giving more weight to the first target trajectory than to the second target trajectory.

14. A vehicle control system that controls a vehicle performing automated driving, the vehicle control system comprising:

at least one processor configured to:

execute vehicle travel control that controls steering, acceleration, and deceleration of the vehicle such that the vehicle follows a target trajectory; and generate a first target trajectory being the target trajectory for the automated driving of the vehicle, wherein at least one processor is further configured to:

determine whether or not an activation condition of travel assist control is satisfied, wherein the travel assist control controls at least one of the steering, the acceleration, and the deceleration for at least one of improving safety or comfort of travel of the vehicle, reducing a sense of strangeness or insecurity of an occupant of the vehicle, and stabilizing behavior of the vehicle; and generate a second target trajectory being the target trajectory for the travel assist control when the activation condition is satisfied, even when the second target trajectory is generated during the automated driving, or when the second target trajectory is generated during the automated driving and a priority condition for giving priority to the first target trajectory is satisfied, execute the vehicle travel control by giving more weight to the first target trajectory than to the second target trajectory, wherein when the second target trajectory is generated during the automated driving, the at least one processor determines whether or not the priority condition for giving priority to the first target trajectory is satisfied, and when the priority condition is satisfied, the at least one processor executes the vehicle travel control by giving more weight to the first target trajectory than to the second target trajectory, the at least one processor acquires first reliability information indicating first reliability being reliability of the automated driving and second reliability information indicating second reliability being reliability of the travel assist control, and the priority condition includes that the first reliability is higher than the second reliability.

15. The vehicle control system according to claim 14, wherein the priority condition includes that a first steering direction required for the vehicle to follow the first target trajectory is opposite to a second steering direction required for the vehicle to follow the second target trajectory.

16. A vehicle control system that controls a vehicle performing automated driving, the vehicle control system comprising:

at least one processor configured to:

execute vehicle travel control that controls steering, acceleration, and deceleration of the vehicle such that the vehicle follows a target trajectory; and generate a first target trajectory being the target trajectory for the automated driving of the vehicle, wherein at least one processor is further configured to:

determine whether or not an activation condition of travel assist control is satisfied, wherein the travel assist control controls at least one of the steering, the acceleration, and the deceleration for at least one of improving safety or comfort of travel of the vehicle, reducing a sense of strangeness or insecurity of an occupant of the vehicle, and stabilizing behavior of the vehicle; and generate a second target trajectory being the target trajectory for the travel assist control when the activation condition is satisfied, even when the second target trajectory is generated during the automated driving, or when the second target trajectory is generated during the automated driving and a priority condition for giving priority to the first target trajectory is satisfied, execute the vehicle travel control by giving more weight to the first target trajectory than to the second target trajectory, wherein in the vehicle travel control, the at least one processor calculates a required control amount of at least one of the steering, the acceleration, and the deceleration required for the vehicle to follow the target trajectory, and controls the at least one of the steering, the acceleration, and the deceleration in accordance with the required control amount, a first required control amount is the required control amount required for the vehicle to follow the first target trajectory, a second required control amount is the required control amount required for the vehicle to follow the second target trajectory, and the giving more weight to the first target trajectory than to the second target trajectory includes determining the required control amount by combining the first required control amount of a first weight and the second required control amount of a second weight less than the first weight.

* * * * *